United States Patent [19]

Joyce et al.

[11] 4,195,341
[45] Mar. 25, 1980

[54] INITIALIZATION OF CACHE STORE TO ASSURE VALID DATA

[75] Inventors: Thomas F. Joyce, Burlington; William Panepinto, Jr., Tewksbury, both of Mass.

[73] Assignee: Honeywell Information Systems Inc., Waltham, Mass.

[21] Appl. No.: 863,094

[22] Filed: Dec. 22, 1977

[51] Int. Cl.² .................. G06F 13/00; G11C 9/06
[52] U.S. Cl. .................................................. 364/200
[58] Field of Search ... 364/200 MS File, 900 MS File

[56] References Cited

U.S. PATENT DOCUMENTS

| 3,217,298 | 11/1965 | Kilburn et al. | 364/200 |
| 3,218,611 | 11/1965 | Kilburn et al. | 364/200 |
| 3,427,592 | 2/1969 | Bahnsen et al. | 364/200 |
| 3,541,529 | 11/1970 | Nelson | 364/200 |
| 3,588,839 | 6/1971 | Belady et al. | 364/200 |
| 3,624,616 | 11/1971 | Patel | 364/200 |
| 3,806,888 | 4/1974 | Brickman et al. | 364/200 |
| 3,840,862 | 10/1974 | Ready | 364/200 |
| 3,889,243 | 6/1975 | Drimak | 364/200 |
| 4,084,236 | 4/1978 | Chelberg et al. | 364/200 |

Primary Examiner—Melvin B. Chapnick
Attorney, Agent, or Firm—George Grayson; Nicholas Prasinos; Ronald T. Reiling

[57] ABSTRACT

A data processing system includes a central processor subsystem, a main memory subsystem and a cache subsystem, all coupled in common to a system bus. During the overall system initialization process, apparatus in the cache subsystem effects the transfer of information from the main memory subsystem to the cache subsystem to load all address locations of the cache subsystem. The transfer of information from the main memory subsystem to the cache subsystem starts from the lowest order address locations in main memory and continues from successive address locations until the cache subsystem is fully loaded. This assures that the cache subsystem contains valid information during normal data processing.

18 Claims, 9 Drawing Figures

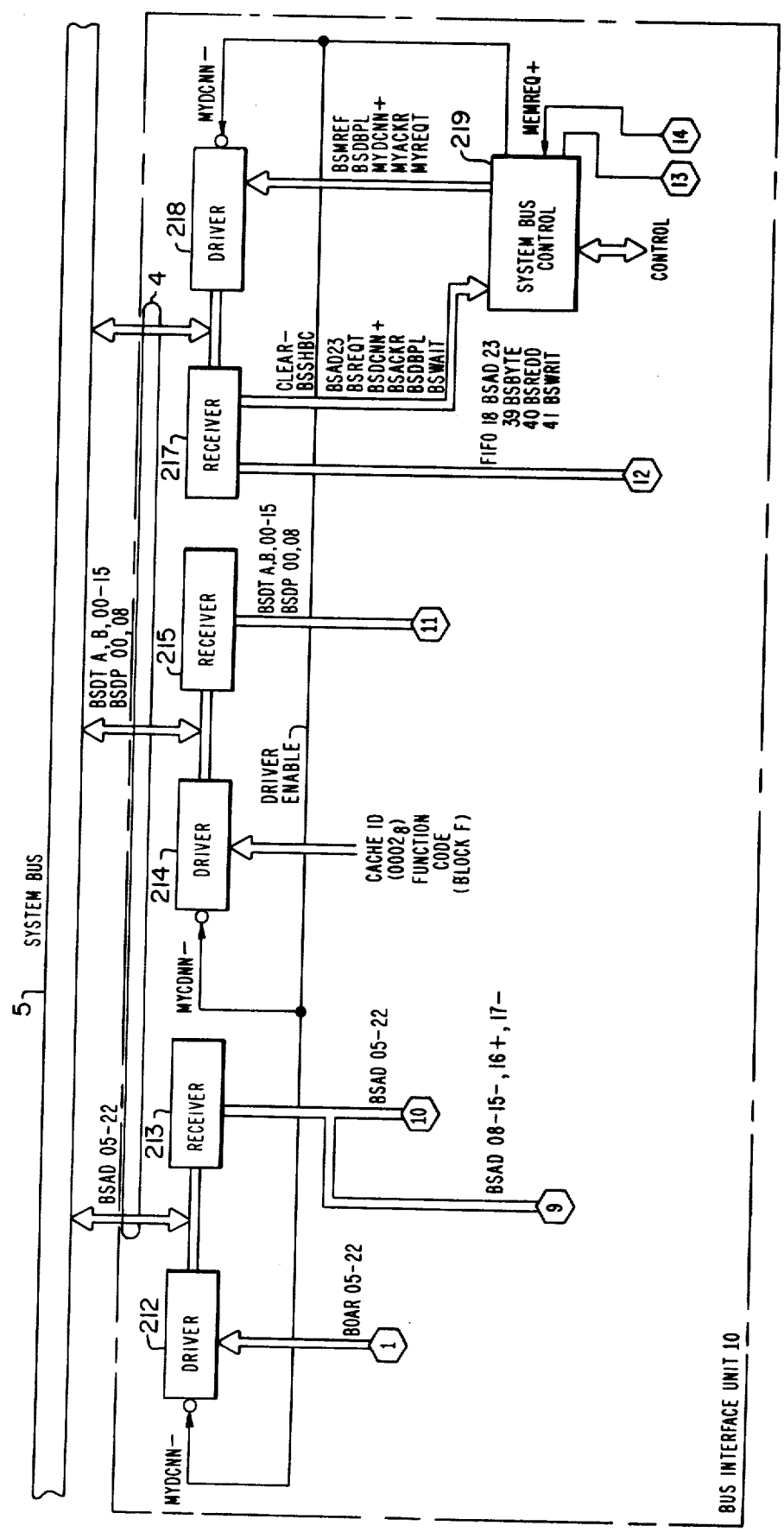
FIG. 2 SHEET 1 OF 4

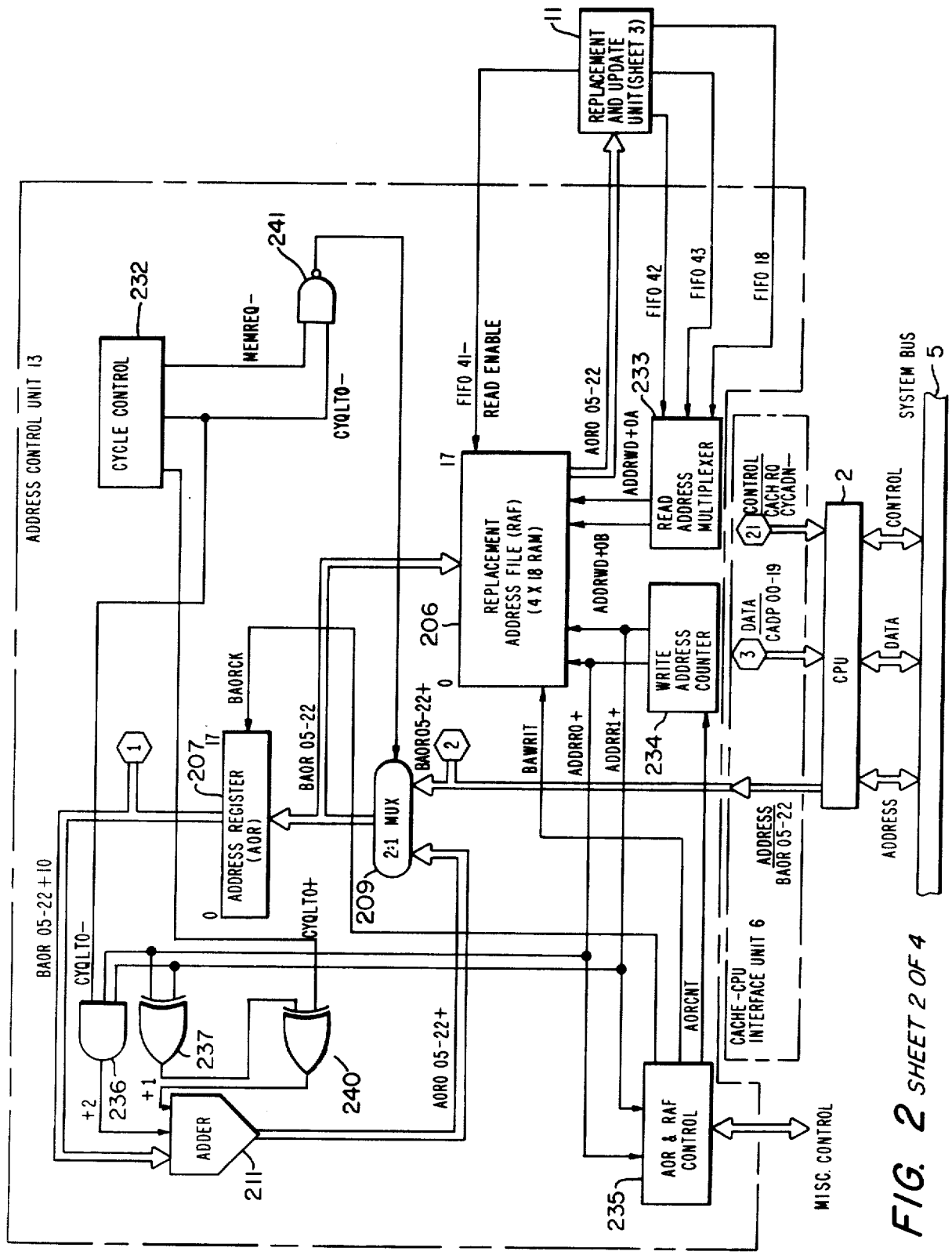
FIG. 2 SHEET 2 OF 4

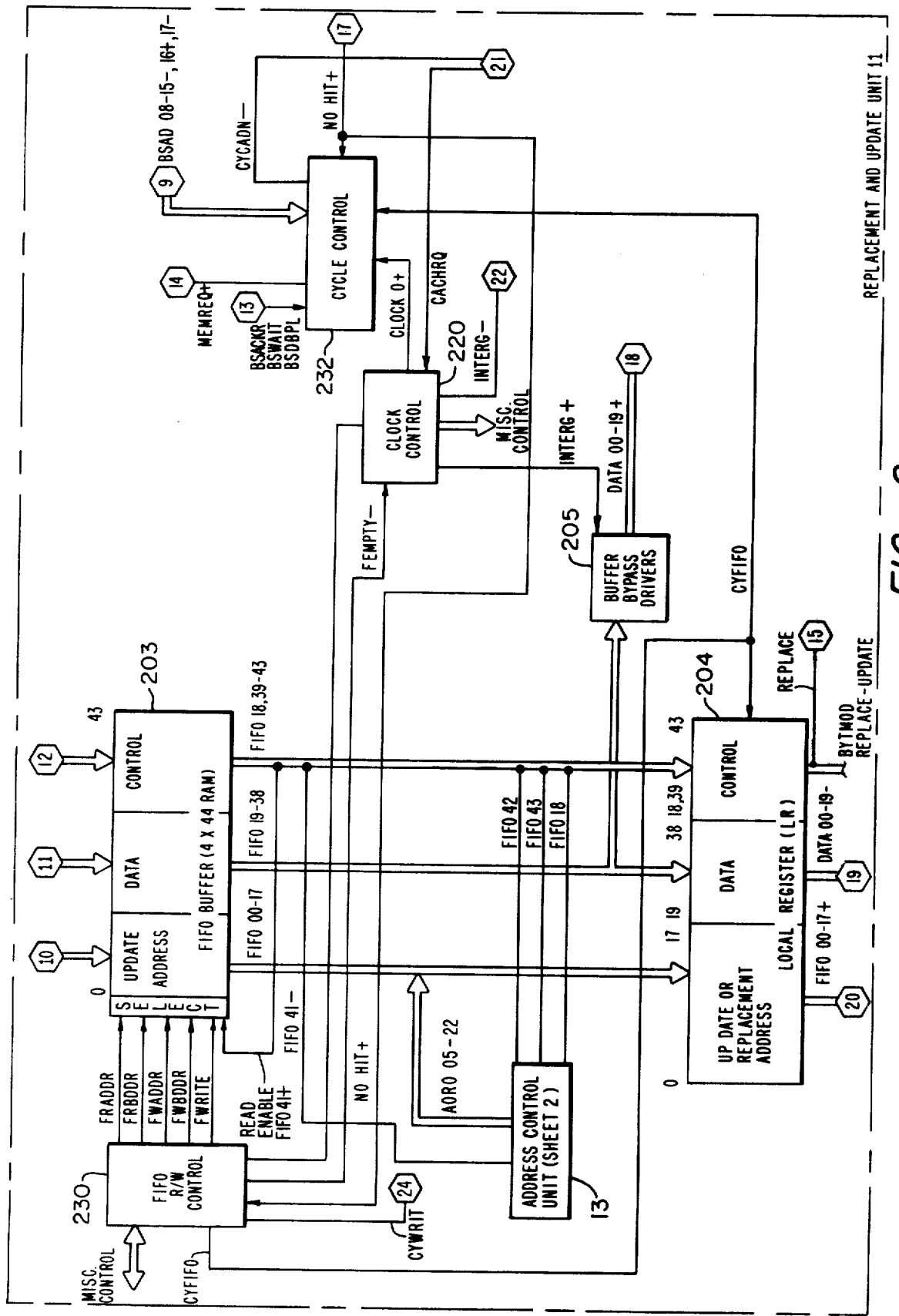

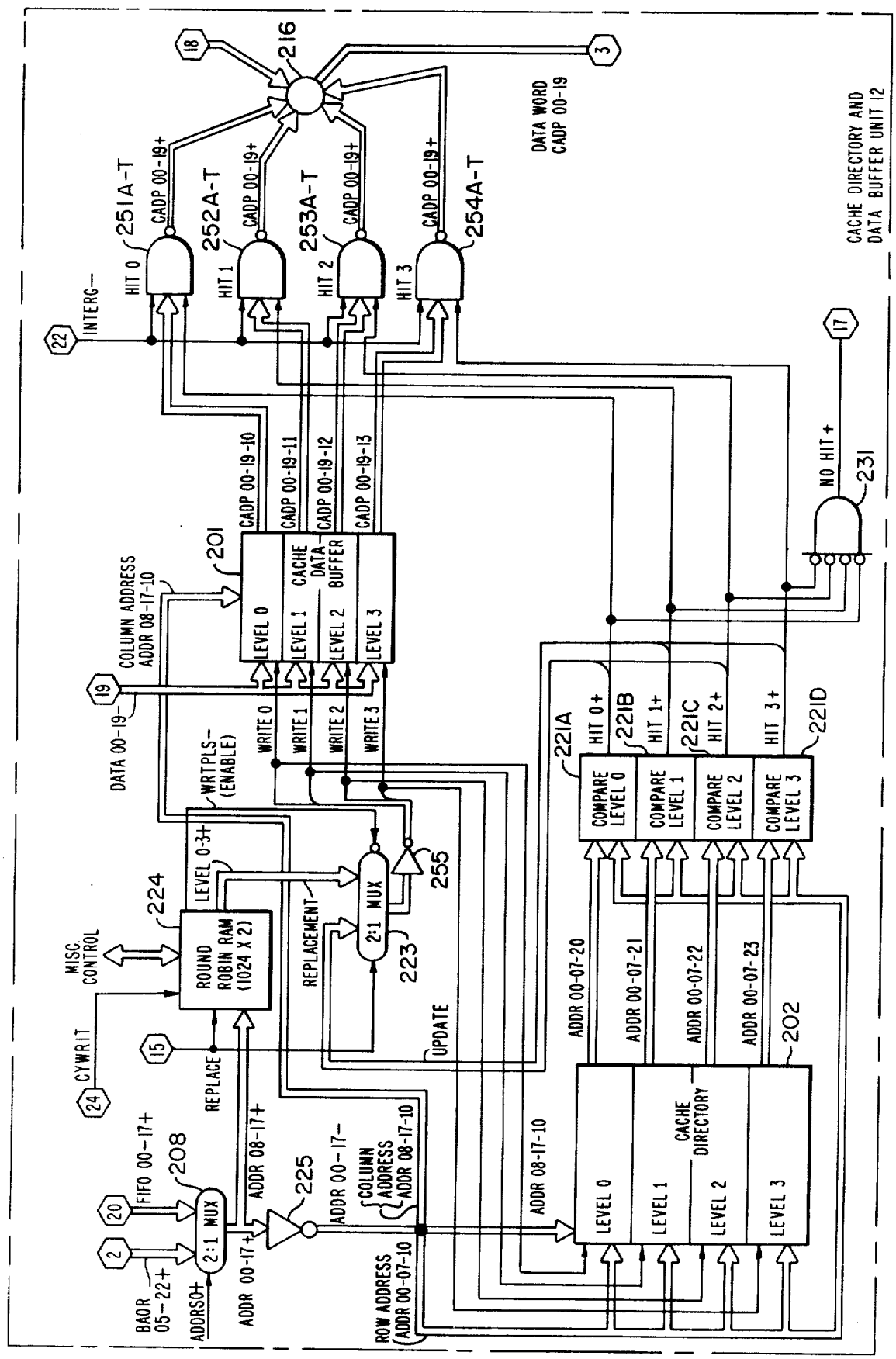
FIG. 2 SHEET 4 OF 4

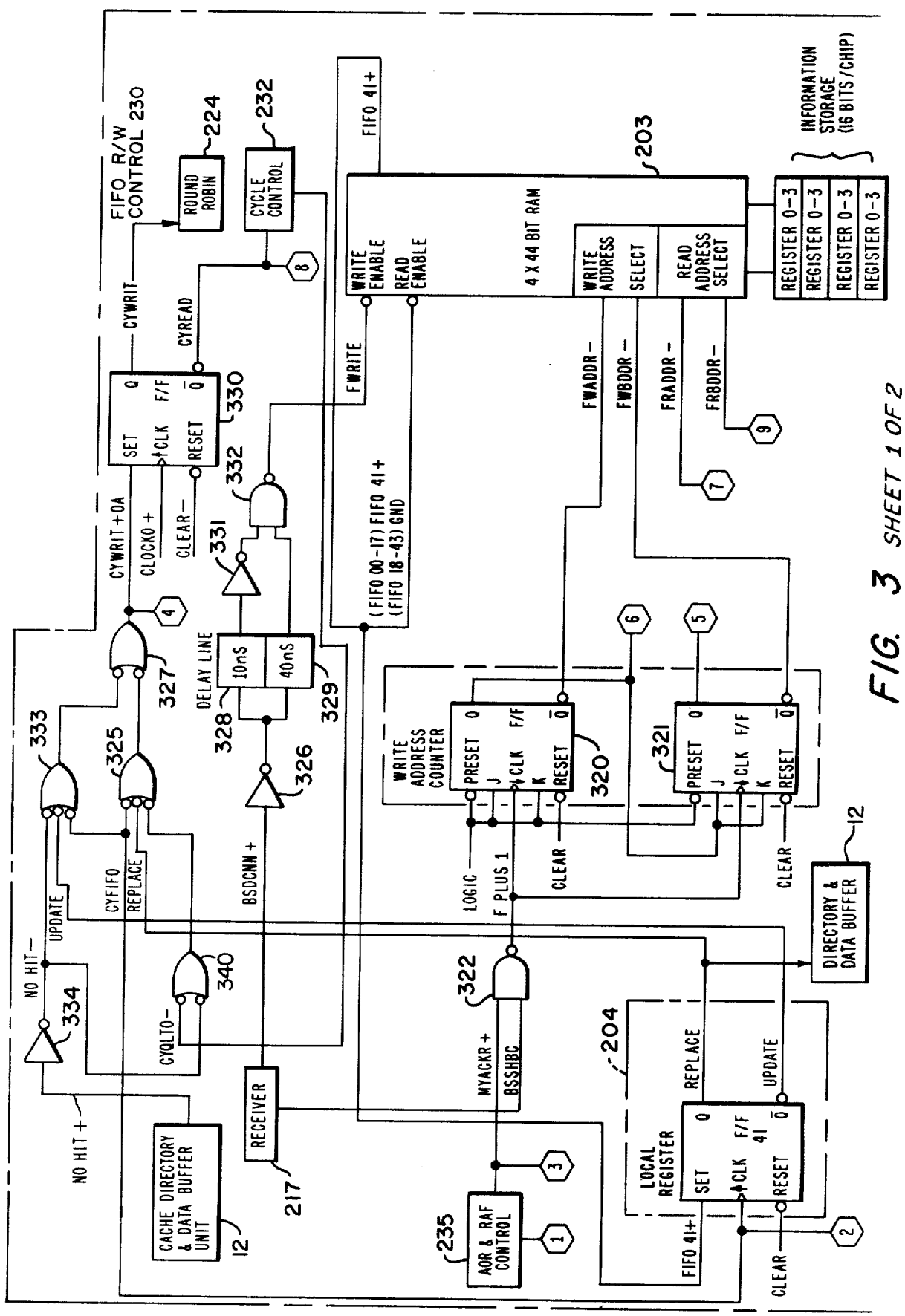

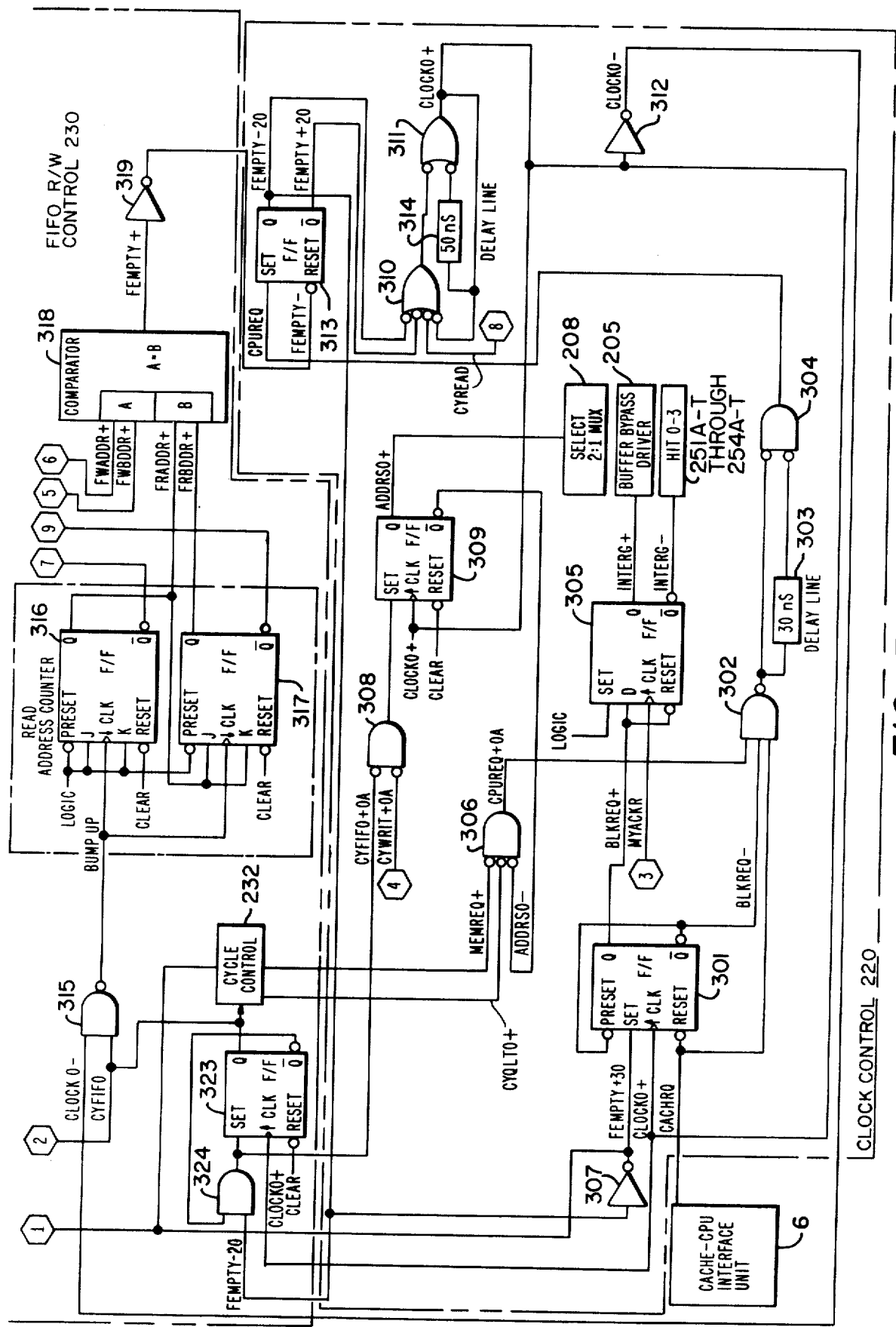
FIG. 3 SHEET 2 OF 2

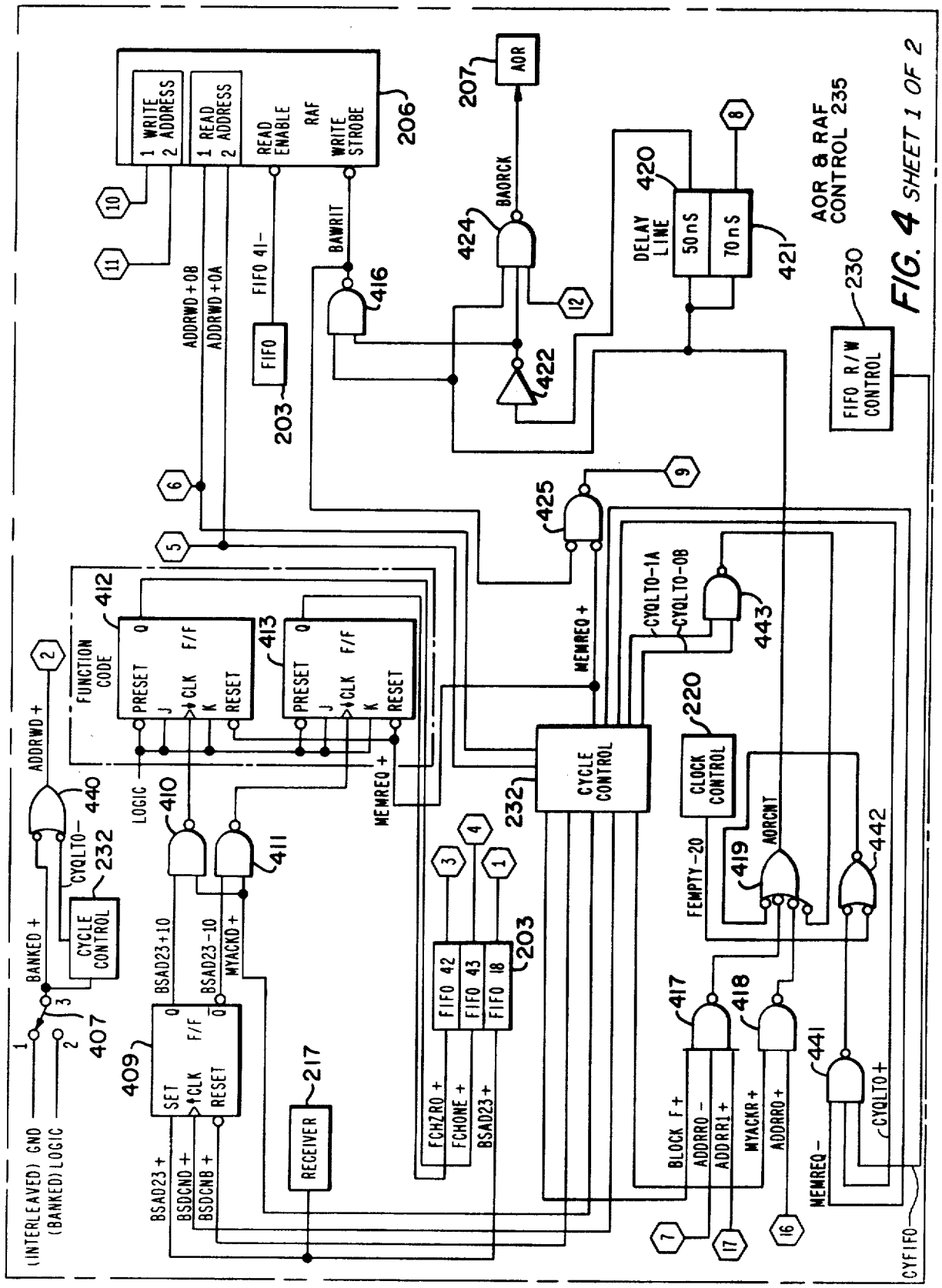
FIG. 4 SHEET 1 OF 2

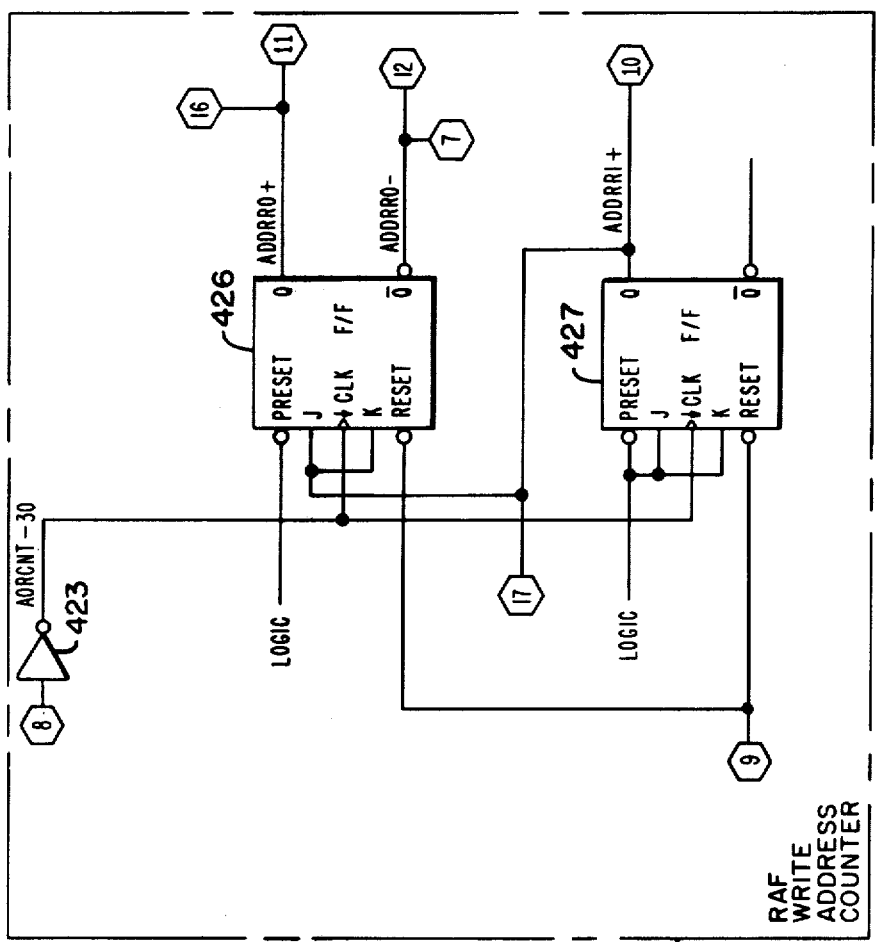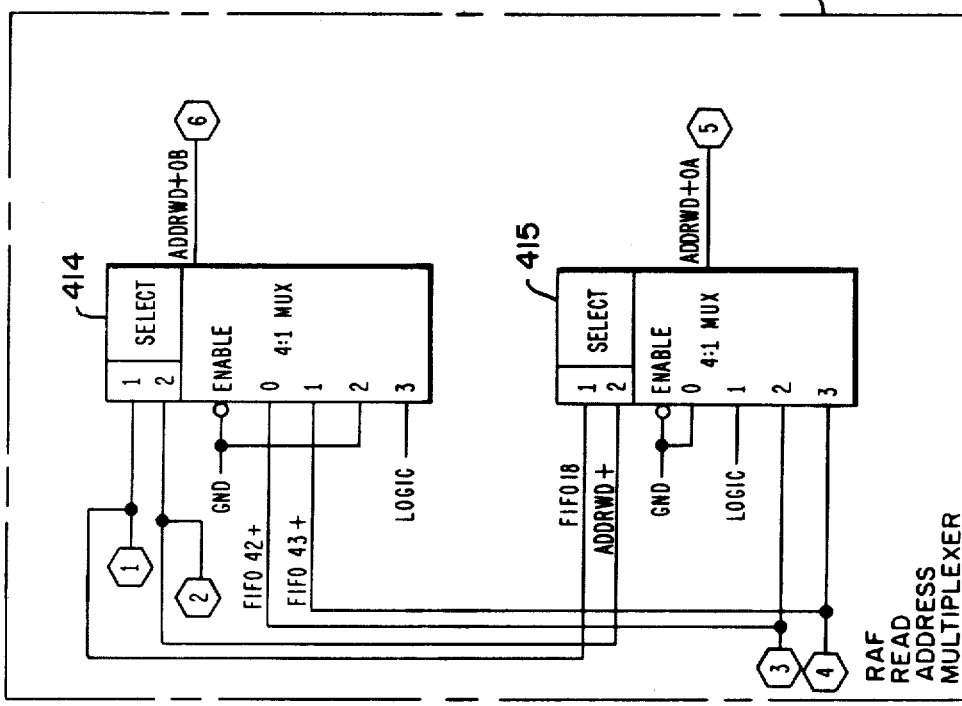
FIG. 4 SHEET 2 OF 2

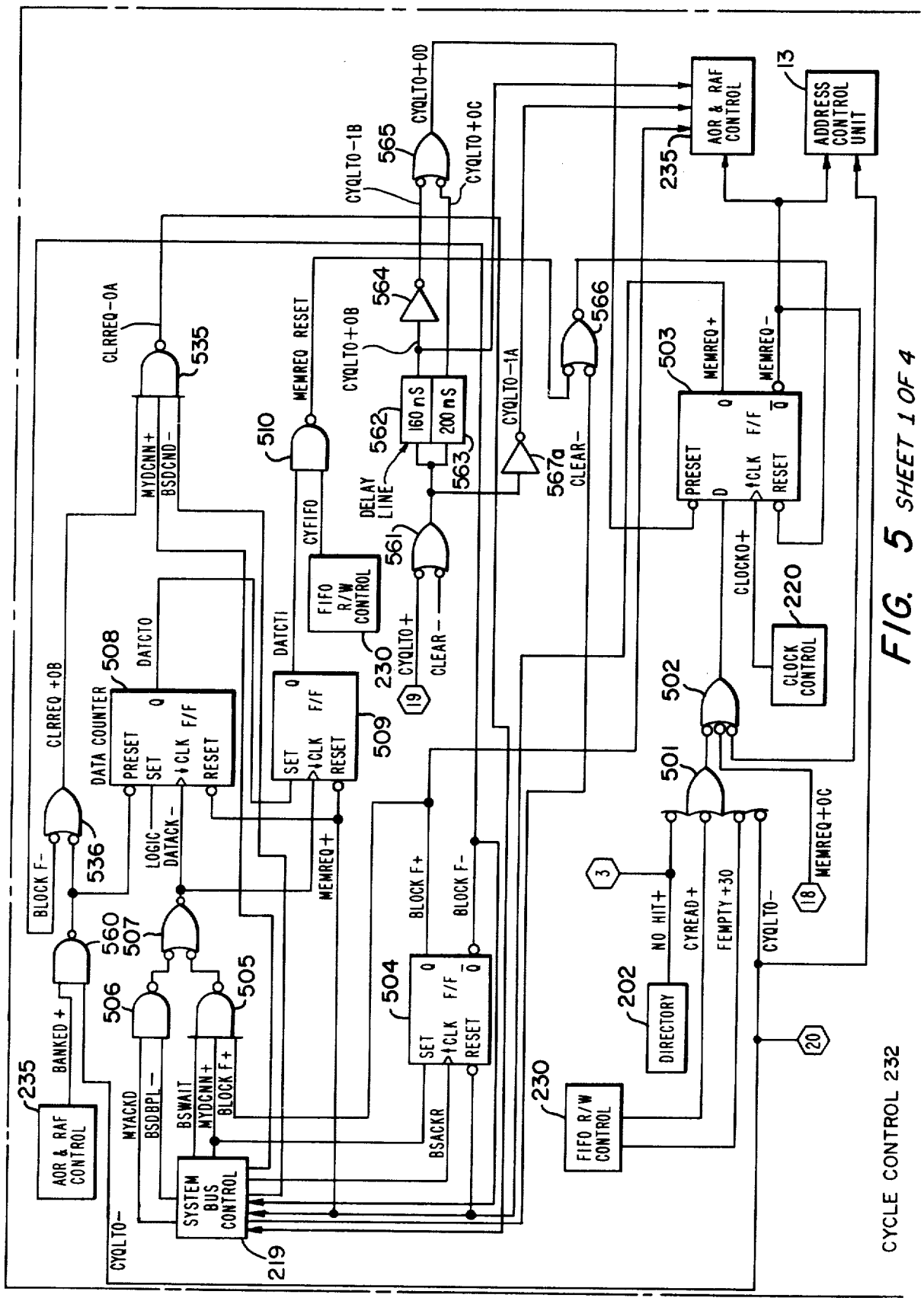
FIG. 5 SHEET 1 OF 4

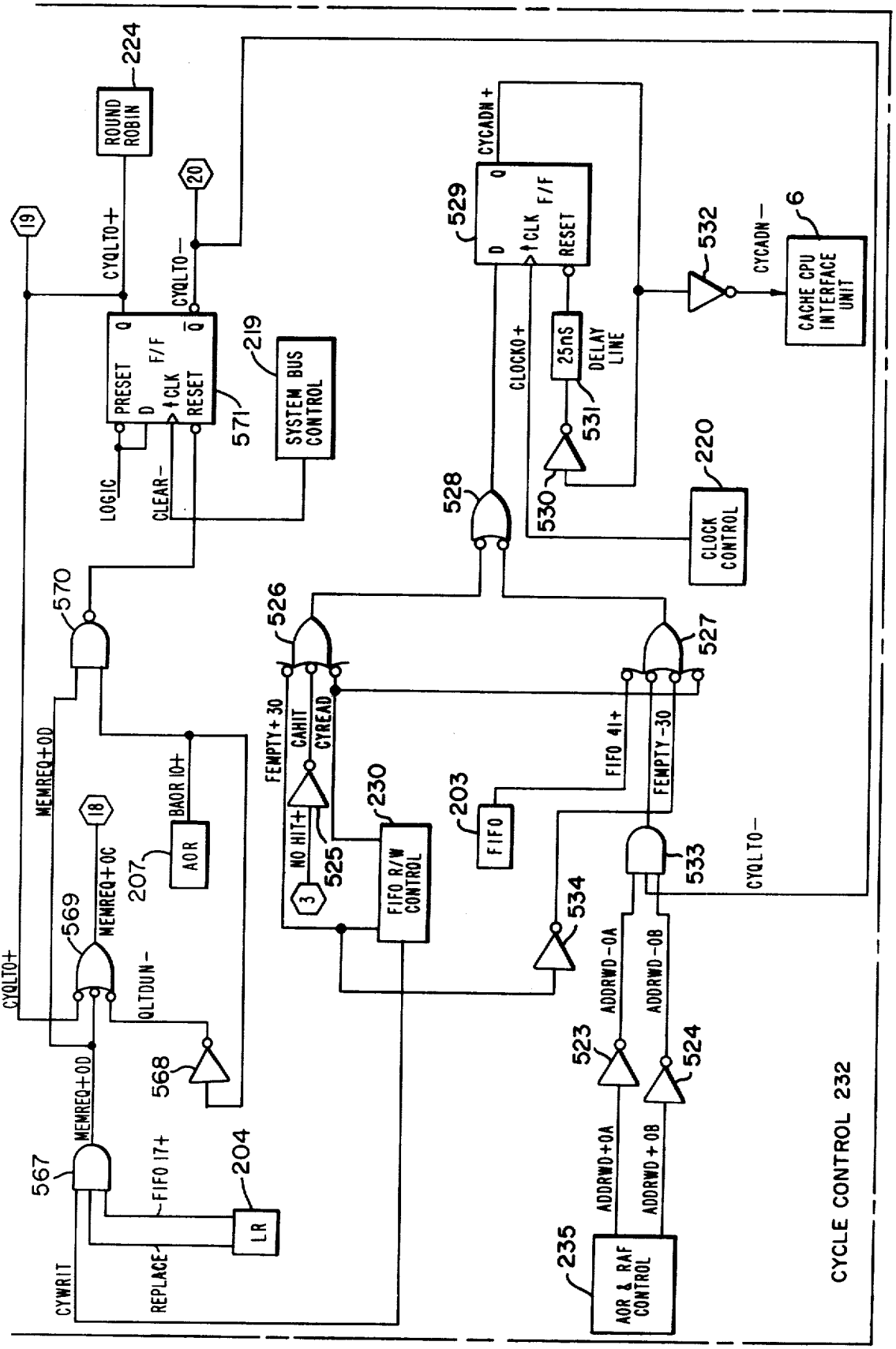
FIG. 5 SHEET 2 OF 4

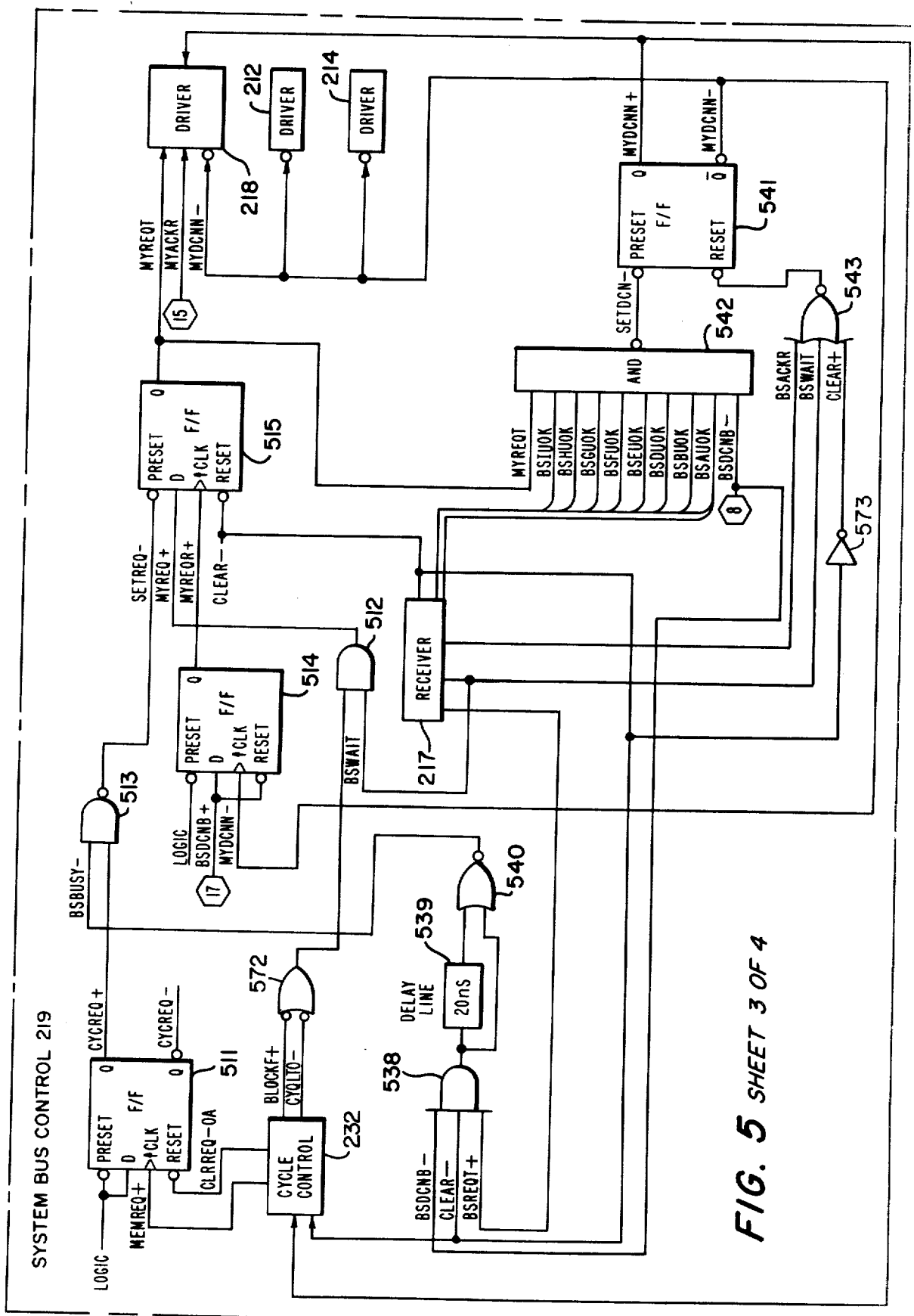
FIG. 5 SHEET 3 OF 4

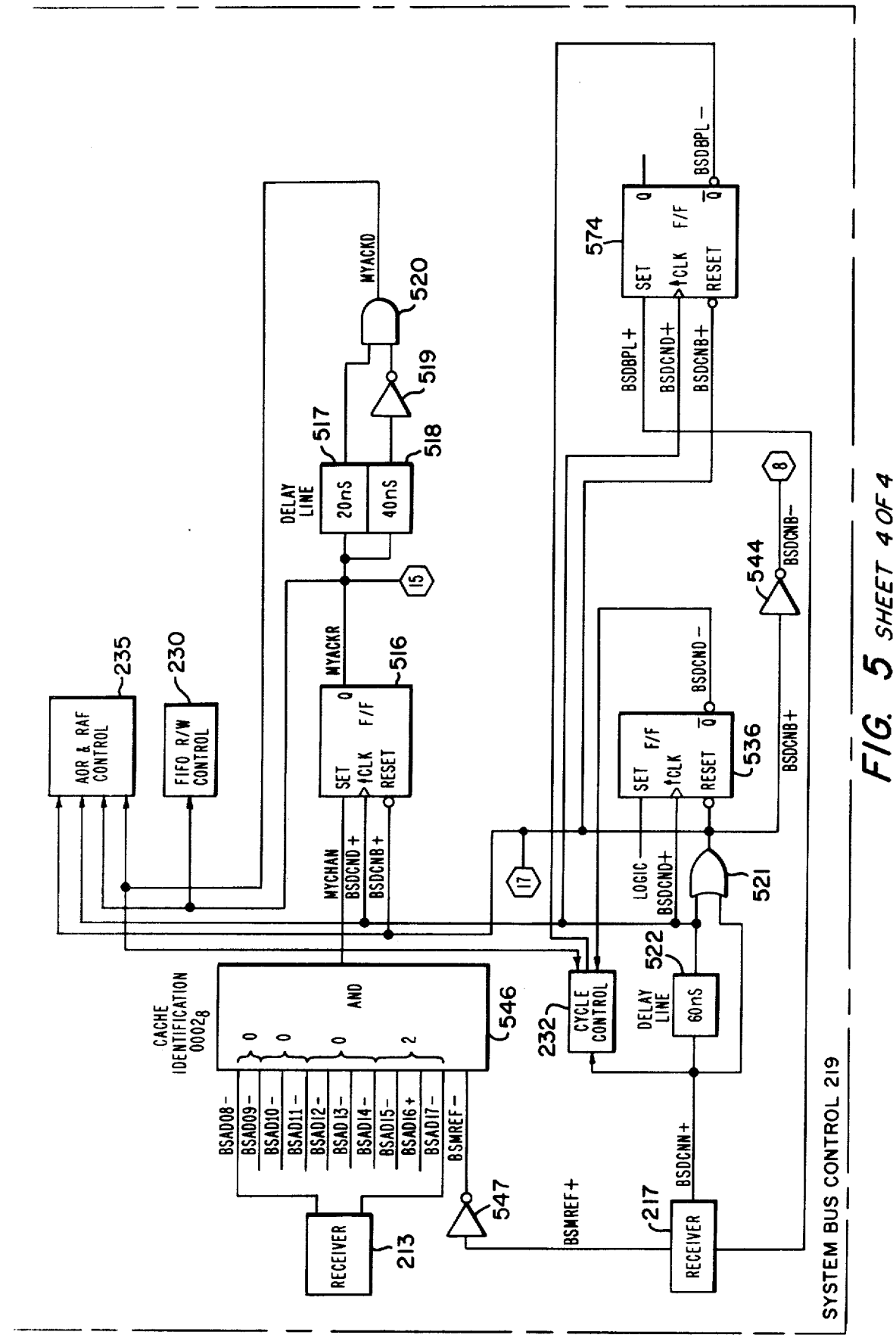

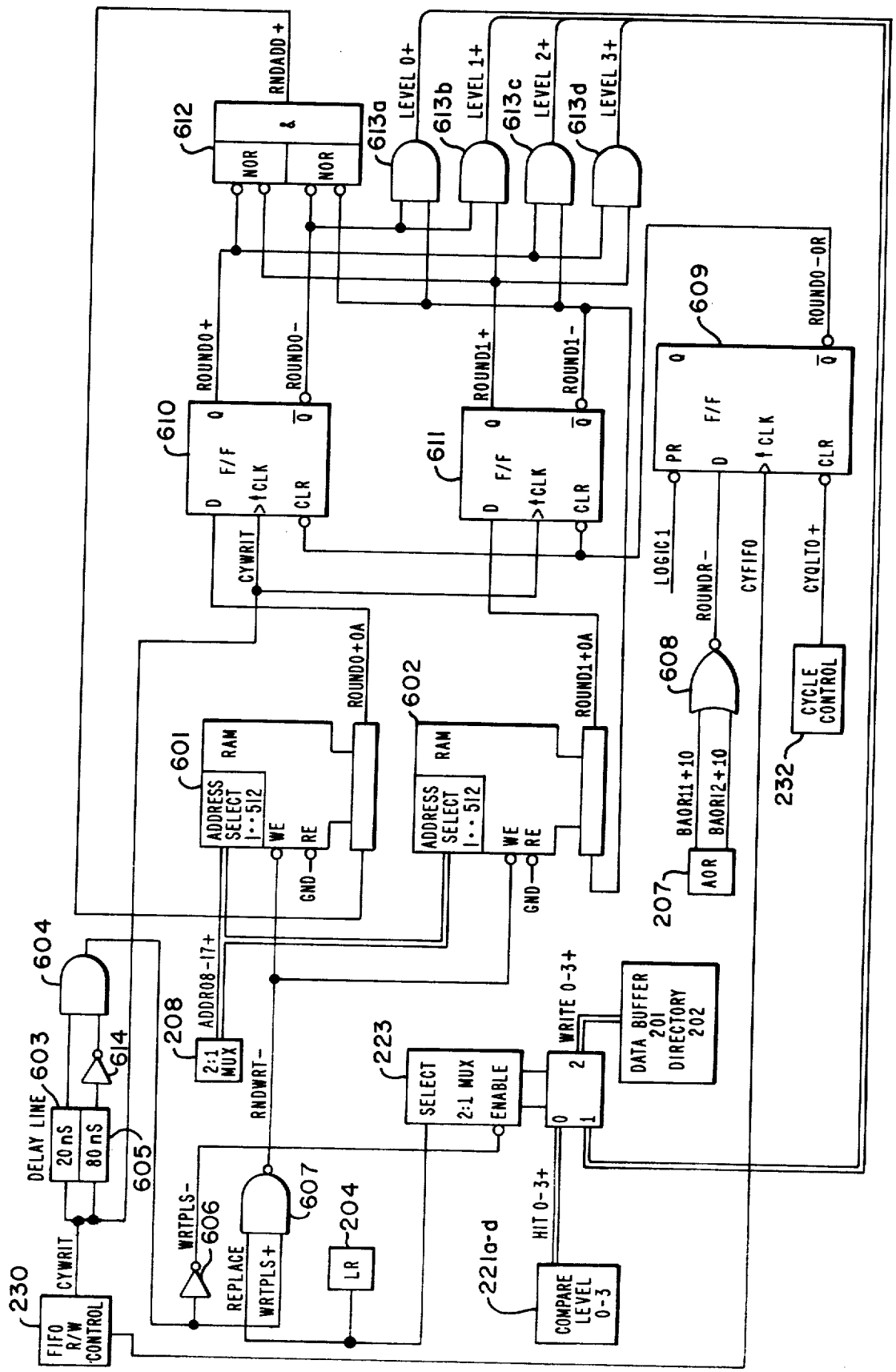
FIG. 6 ROUND ROBIN 224

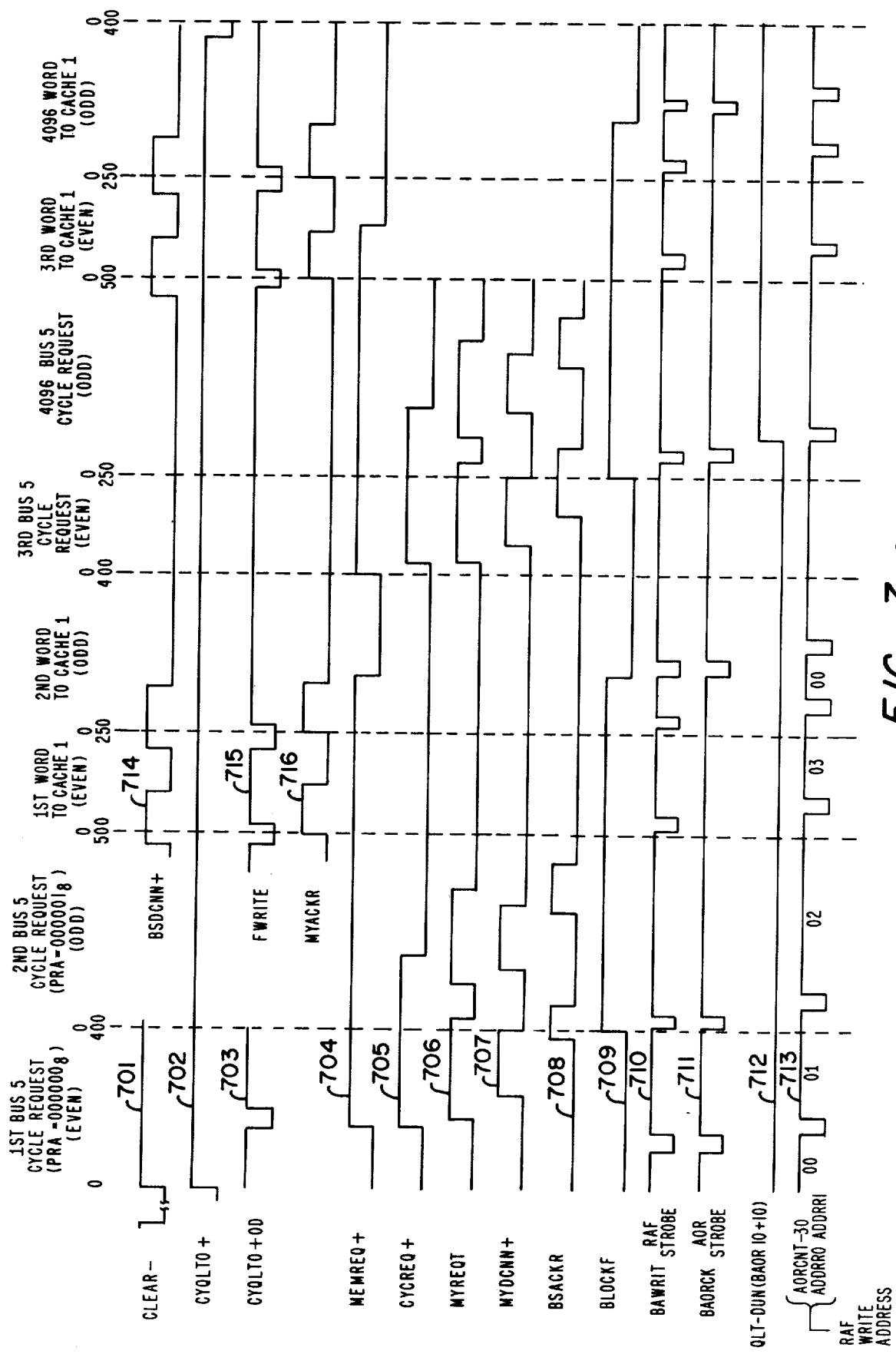

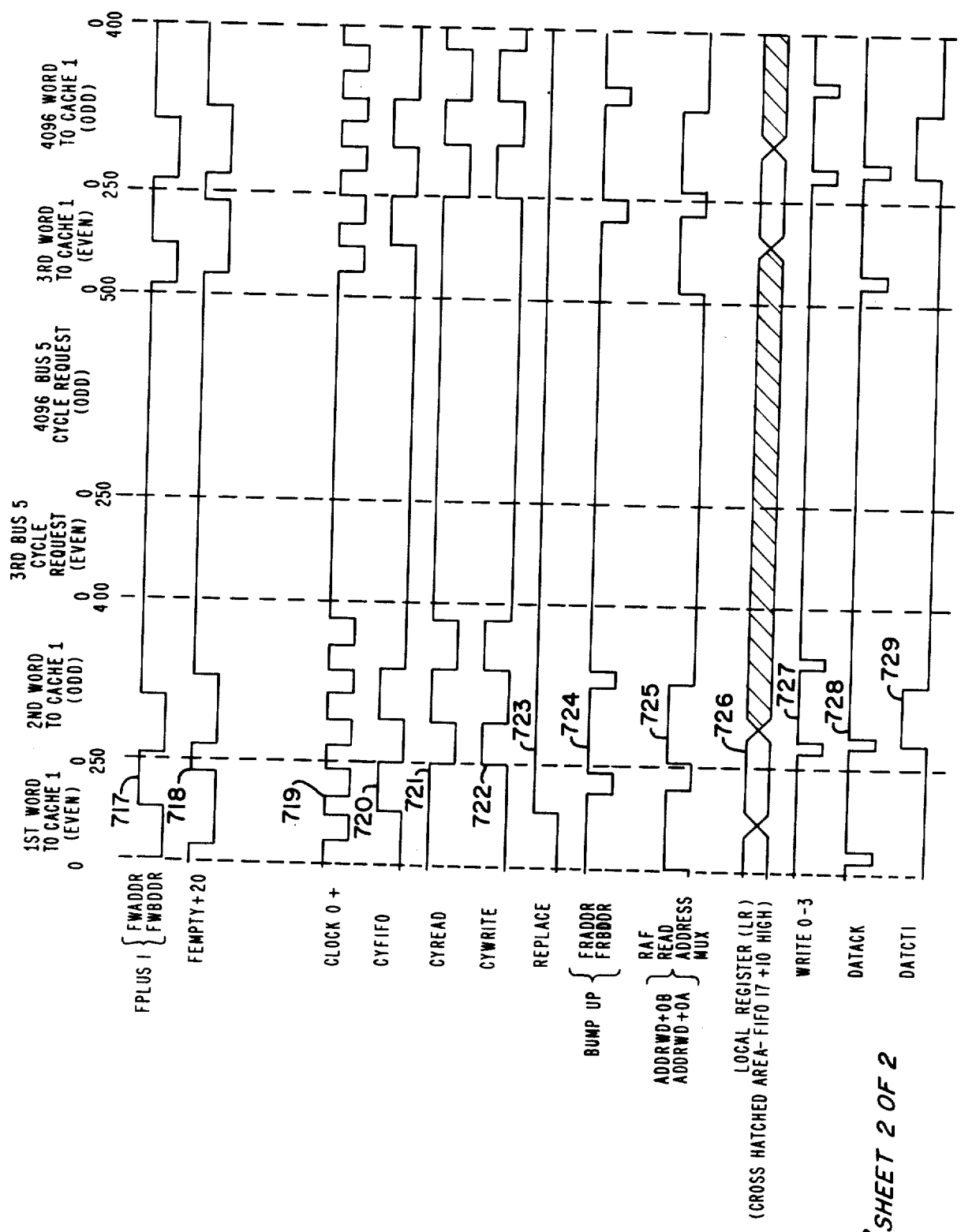
FIG. 7 SHEET 2 OF 2

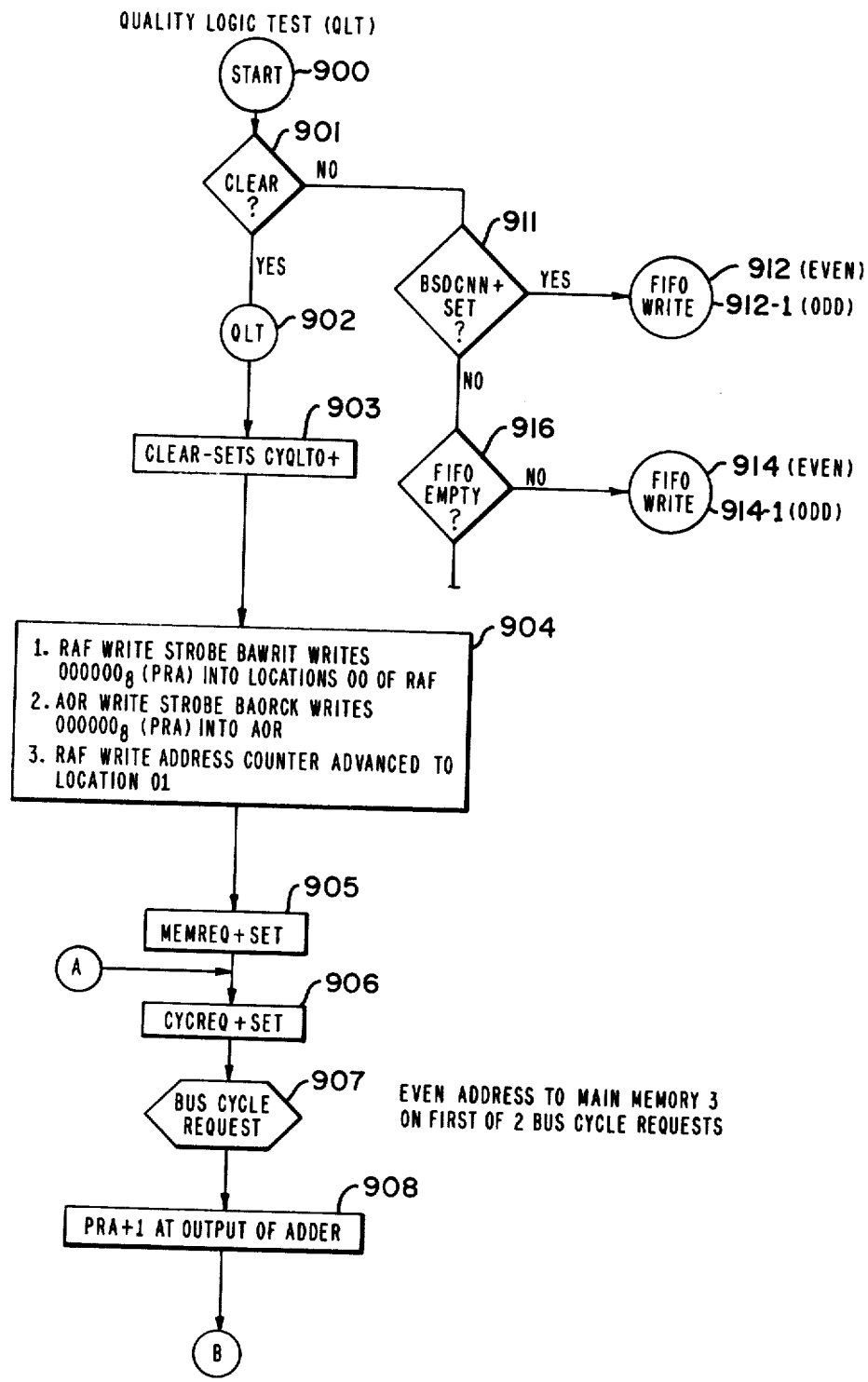
FIG. 9 SHEET 1 OF 7

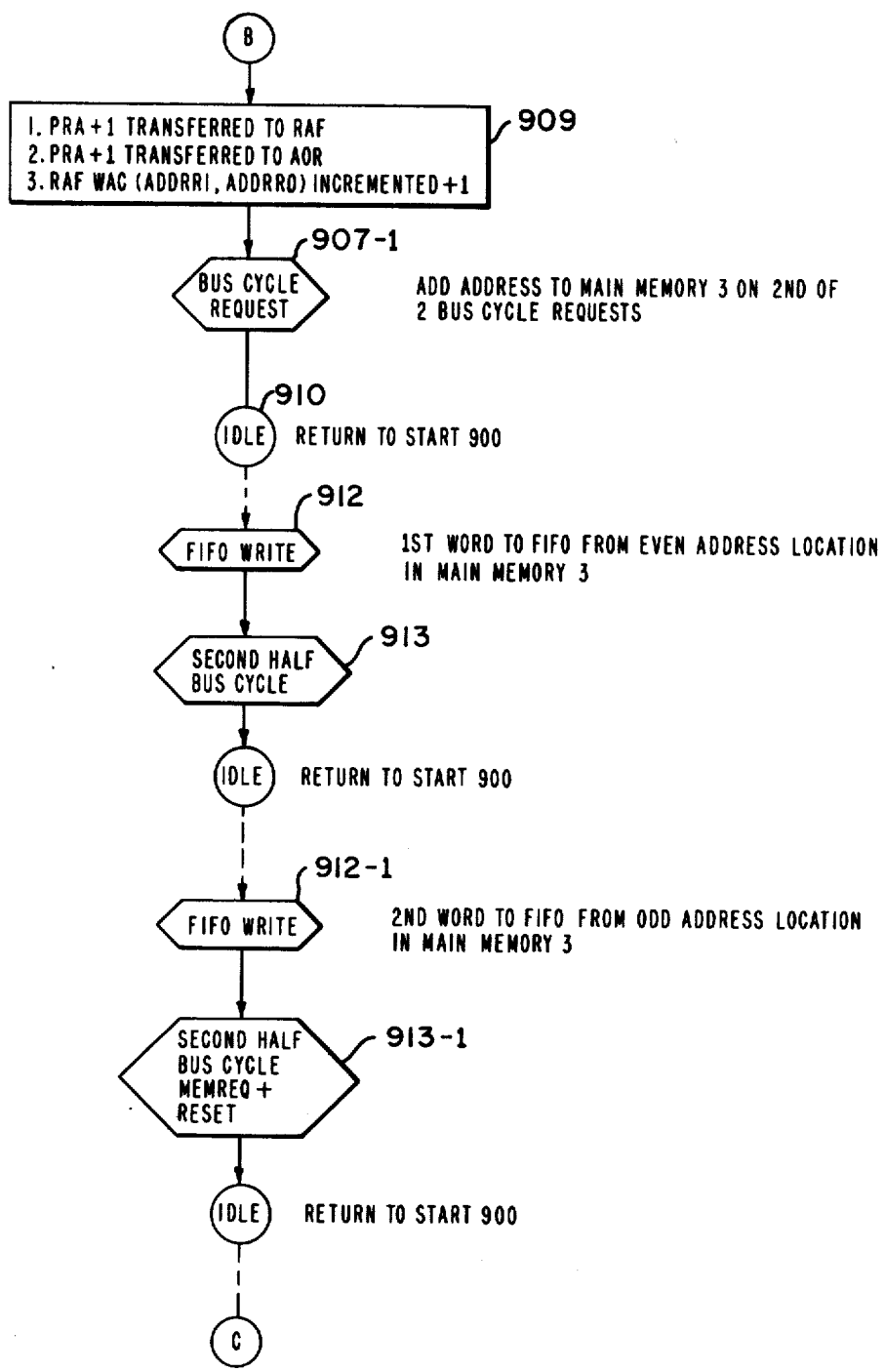
FIG. 9 SHEET 2 OF 7

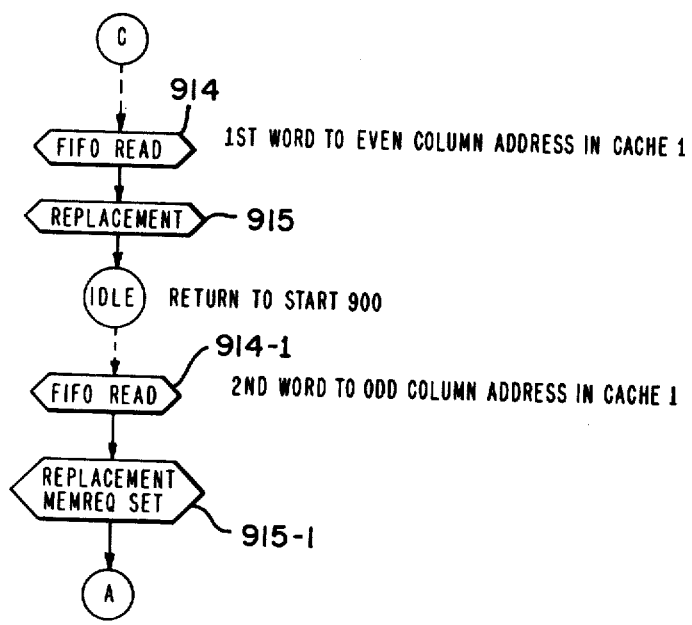
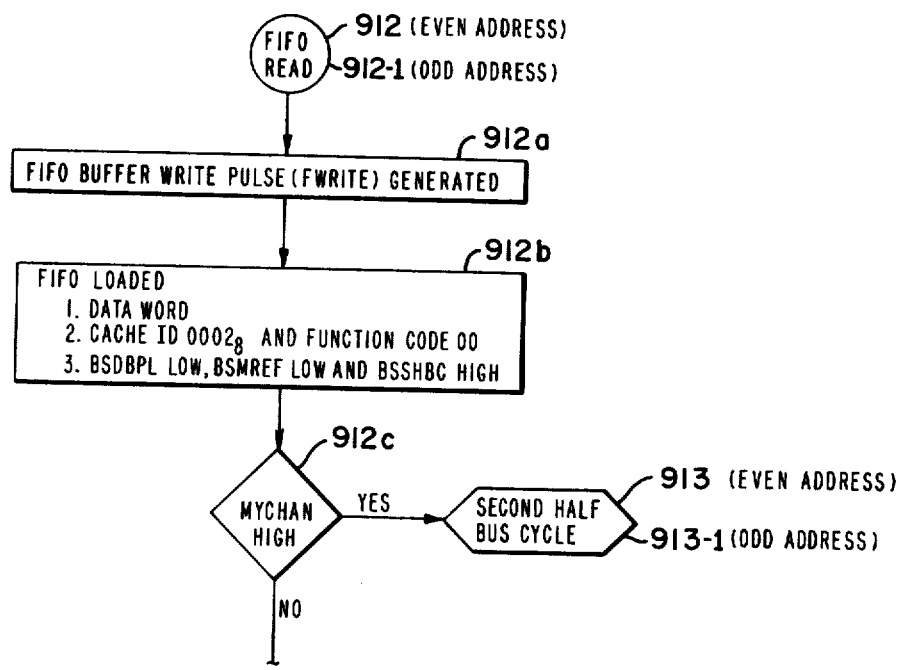
FIG. 9 SHEET 3 OF 7

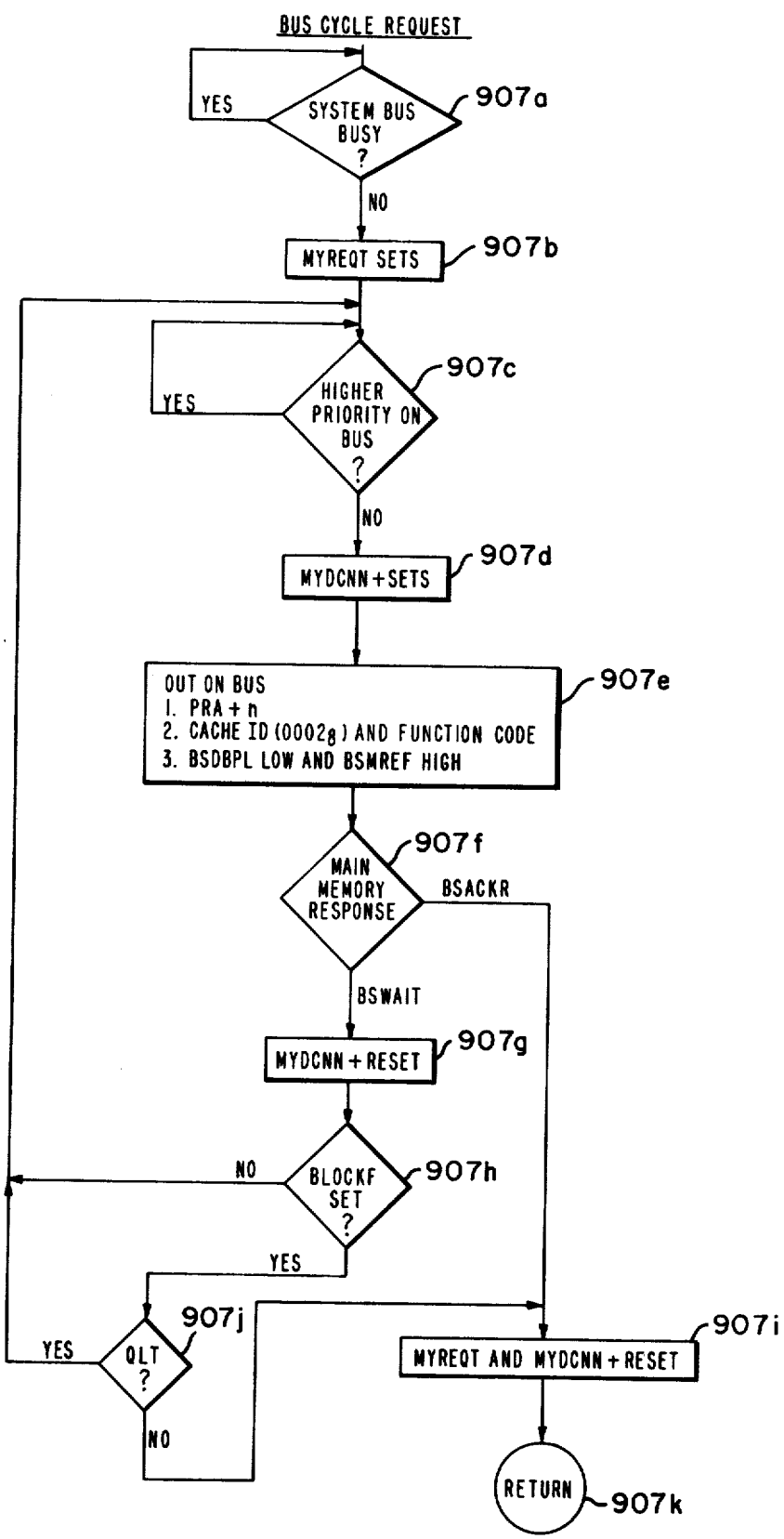
FIG. 9 SHEET 4 OF 7

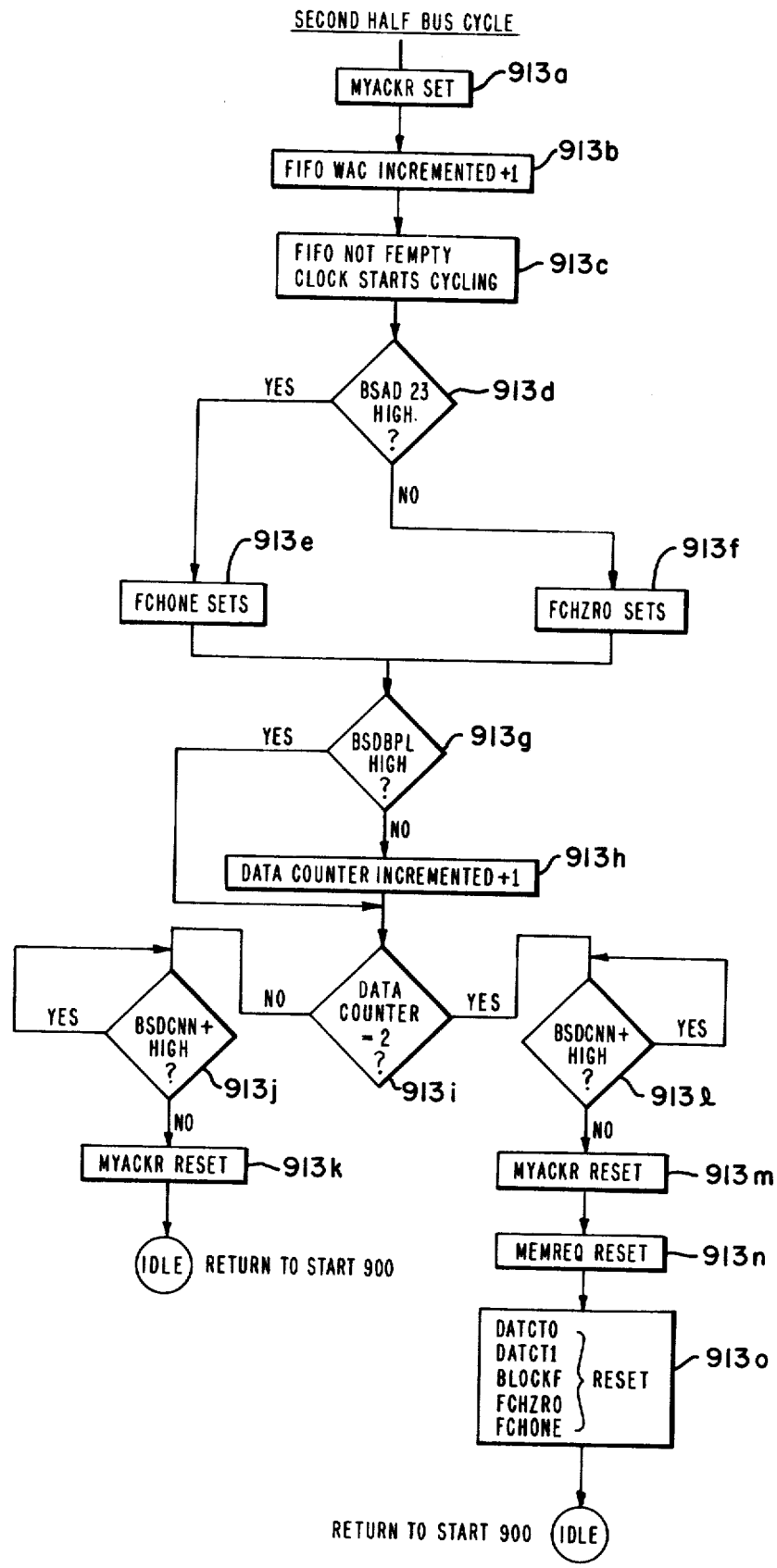
FIG. 9 SHEET 5 OF 7

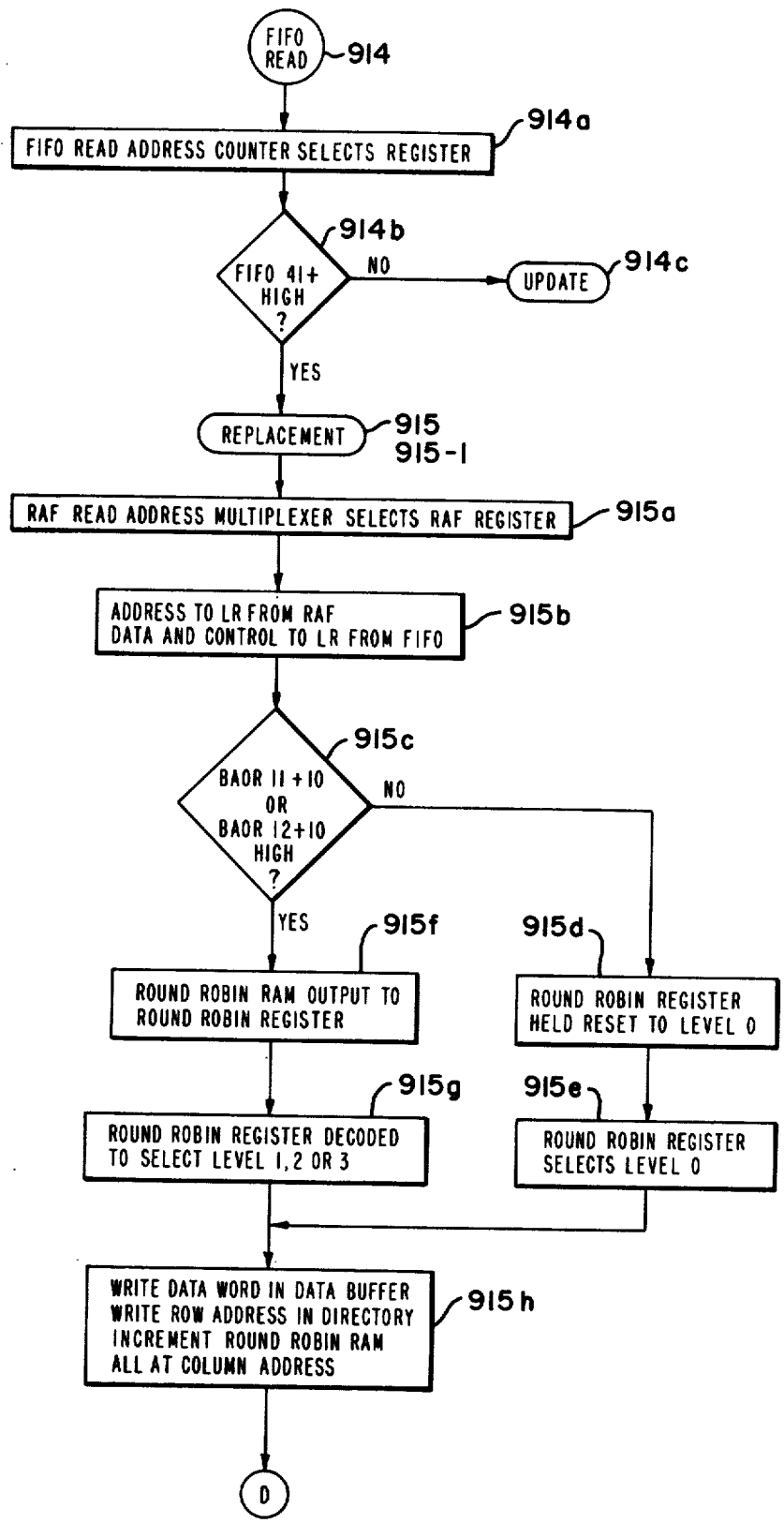
FIG. 9 SHEET 6 OF 7

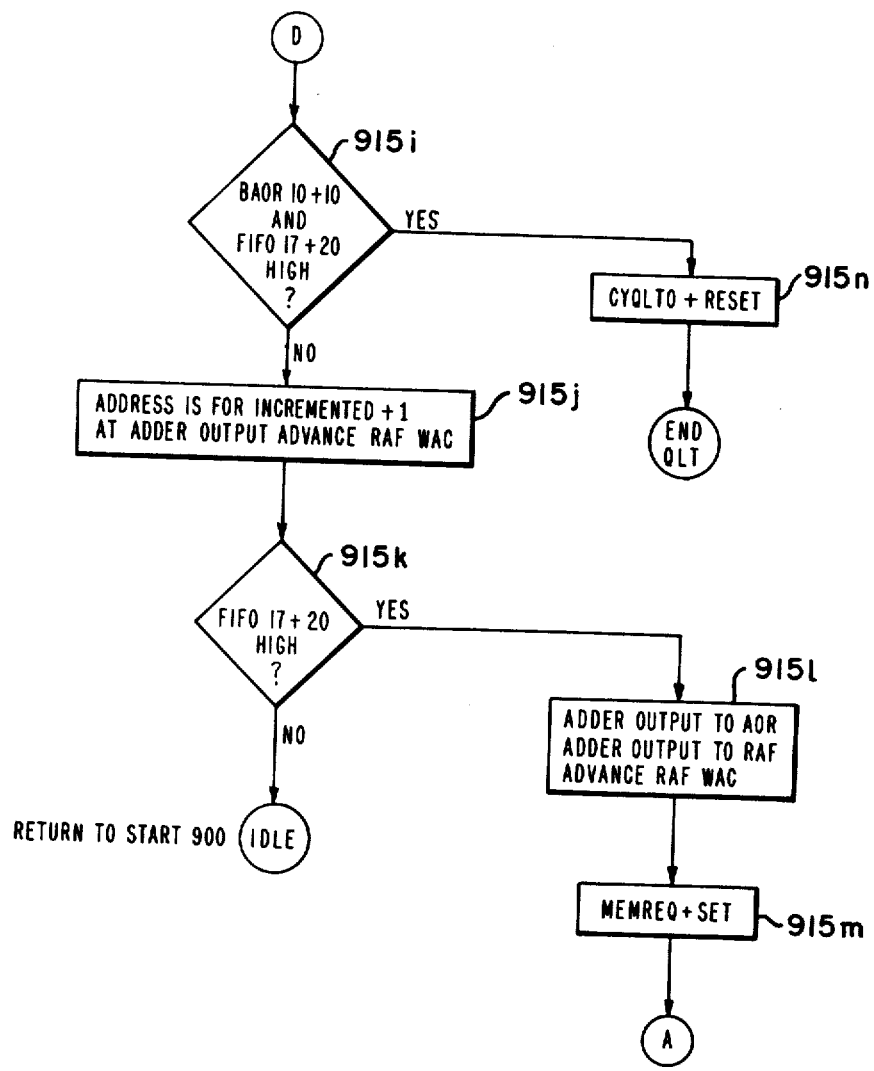
FIG. 9 SHEET 7 OF 7

INITIALIZATION OF CACHE STORE TO ASSURE VALID DATA

RELATED APPLICATIONS

The following patent applications which are assigned to the same assignee as the instant application have been filed on even date with the instant application and contain related subject matter.

BACKGROUND OF THE INVENTION

1. Field of the Invention

This invention relates generally to minicomputer systems and more particularly to storage hierarchies having high speed, low capacity storage devices and lower speed, high capacity storage devices coupled in common to a systems bus.

2. Description of the Prior Art

The storage hierarchy concept is based on the phenomena that individual stored programs under execution exhibit the behavior that in a given period of time a localized area of memory receives a very high frequency of usage. Thus, a memory organization that provides a relatively small size buffer at the CPU interface, and in addition include various levels of increasing capacity slower storage, can provide an effective access time that lies somewhere in between the range of the fastest and the slowest elements of the hierarchy and provides a large capacity memory system that is "transparent" to the software.

Prior art systems provide a relatively small size buffer or cache interposed between the main memory and the central processor unit (CPU) to improve systems throughput. The CPU requests information from cache. If the information is not in cache it is requested of main memory. In order for this system to work well, information in both cache and main memory at address locations identified by the same address bit configurations must be the same information. At the conclusion of the initialization process there must be a means of assuring that residual information left in cache from a previous operation does not adversely impact the system.

U.S. Pat. No. 3,840,862 issued to D. T. Ready entitled "Status Indicator Apparatus for Tag Directory in Associative Stores" and U.S. Pat. No. 3,845,474 issued to R. E. Lange, et al., entitled "Cache Store Clearing Operation for a Multiprocessor Mode" both describe the use of full/empty or validity bits to indicate valid from invalid information in cache.

In addition to eliminating the need for full/empty or validity bits with their associated circuitry, the invention described herein improves the test and diagnostic capabilities of the cache system.

OBJECTS OF THE INVENTION

It is an object of the invention to provide an improved cache system wherein the cache and main memory store the same information in the same address locations defined by the same address bit configurations.

It is another object of the invention to initialize the cache system without the use of full/empty bits or validity bits.

It is still another object of the invention to reduce the cost of the cache.

It is still another object of the invention to make the entire cache available during systems operations.

SUMMARY OF THE OPERATION

The above and other objects are achieved in a preferred embodiment of the present invention which comprises a main memory, a CPU and a cache all connected in common to the system bus.

In the preferred embodiment, as part of the initialization procedure the cache is put into a Quality Logic Test (QLT) mode. In this mode, the cache is loaded from the 4096 low order address locations of main memory over the system bus. This is accomplished by the initialization signal CLEAR being received by the cache. The CLEAR signal going low sets the logic of the cache system to an initialization state. On the rise of the CLEAR signal, a QLT flop sets. Setting the QLT flop results in the cache system making a request of main memory for the data word at address location 0000. Cache then makes another request of main memory for the data word at address location 0001.

Cache makes the request of main memory by first requesting a system bus cycle. When the system bus is available to cache, cache sends a memory request out on the bus. Main memory receives the request and sends an acknowledge signal out on the system bus if the memory request is in the correct format. This procedure is described in copending related application 4 described supra.

After the second main memory request by cache, main memory sends back over the system bus on 2 bus cycles, the two data words requested. Cache then makes 2 more requests of main memory for the data words in address locations 0002 and 0003. Main memory sends the 2 requested words back to memory. This process is repeated until 4096 words are received by cache after which the QLT mode is concluded by resetting the QLT flop.

In addition to assuring that the cache contains the same data as main memory, the QLT function is also used in the test and diagnostic mode. In that test and diagnostic mode cache is loaded from main memory in the QLT mode. Then the CPU requests successive data word locations of cache which should be stored in cache. If any of these address locations is not in cache then a signal is sent to the CPU. This is described in related copending application 5 described supra.

BRIEF DESCRIPTION OF THE DRAWINGS

FIG. 2 is a block diagram of the cache system;

FIG. 3 is a logic circuit diagram of Clock Control and FIFO R/W Control;

FIG. 4 is a logic circuit diagram of AOR and RAF Control, the RAF Write Address Counter and the RAF Read Address Multiplexer;

FIG. 5 is a logic circuit diagram of Cycle Control and System Bus Control;

FIG. 6 is a logic diagram of the round robin;

FIG. 7 is a timing diagram of the Quality Logic Test operation;

FIG. 9 is a flow diagram illustrating the Quality Logic Test operation.

DESCRIPTION OF THE PREFERRED EMBODIMENTS

OVERALL SYSTEM

Figure 1:
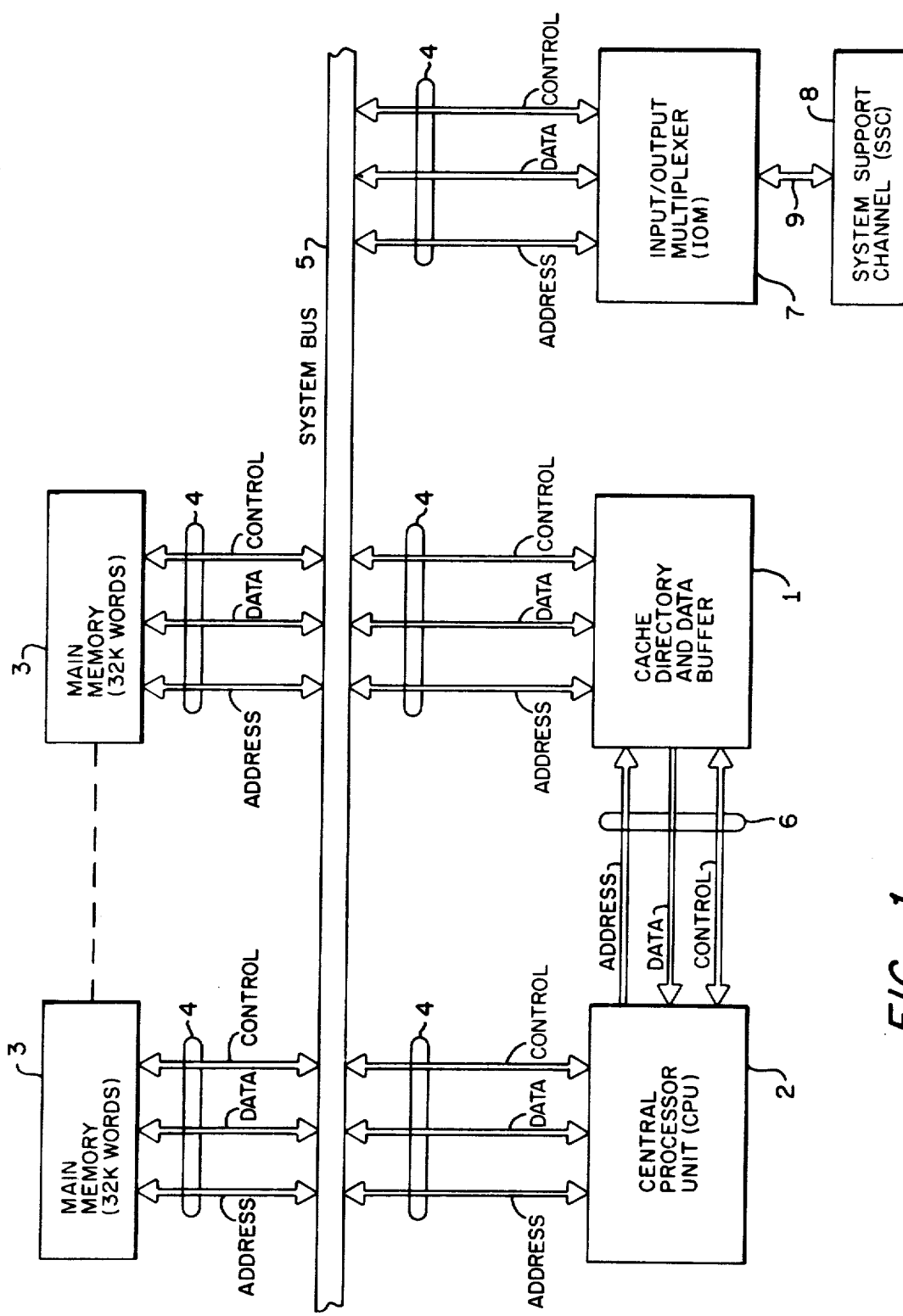
FIG. 1 is a block diagram of the overall system.

FIG. 1 is a block diagram of a minicomputer system which comprises a central processor unit (CPU) 2, a main memory 3, an input/output multiplexer (IOM) 7, a system bus 5, a cache directory and data buffer (cache) 1 and a system support channel (SSC) 8. Not shown are the normal complement of standard peripherals connected to the system by SSC 8. With the exception of SSC 8, each unit couples to the system bus 5 via an interface signal bus 4; SSC 8 couples to the IOM 7 through input/output (I/O) bus 9. In addition, CPU 2 and cache 1 are interconnected by a private interface signal bus 6. IOM 7, I/O bus 9 and SSC 8 are not pertinent to the invention and will not be described in detail.

CPU 2 is designed for use as a communications network processor and is a firmware controlled 20 bits per word binary machine. Main memory 3 can be added to the system in modules of 32,768 words up to a maximum of 8 modules or 262,144 words. Main memory 3 is made up of random access MOS chips with 4,096 bits stored in each chip and has a read/write cycle time of 550 nanoseconds. Cache 1 provides an intermediate high speed storage with a maximum road/write cycle time of 240 nanoseconds. CPU 2 requests a data word from cache 1 over private interface 6 and obtains the data word if in cache 1 in 110 nanoseconds over private interface bus 6. If the requested data is not in cache 1, then CPU 2 receives the data via main memory 3, bus 5, cache 1 and bus 6 in 960 nanoseconds. If cache 1 was not in the system, then the CPU 2/main memory 3 read access time is 830 nanoseconds. Using the prefetch techniques of this invention assures that in most cases over 90% of the requested data words are stored in cache 1 thereby greatly increasing the throughput of the system using cache 1 over a system without cache 1. System bus 5 permits any two units on the bus to communicate with each other. To communicate, a unit must request a bus 5 cycle. When the bus 5 cycle is granted, that unit may address any other unit on bus 5. I/O bus 9 is identical to system bus 5 in performance and in signal makeup. IOM 7 controls the flow of data between bus 5 and the various communications and peripheral controllers of the system via I/O bus 9. SSC 8 is a microprogrammed peripheral controller which provides control for various devices (not shown). Other controllers (not shown) may also connect to I/O bus 9.

CPU 2 updates data in main memory 3 by sending the data word with its main memory 3 address and the appropriate control signals out on bus 5. Cache 1, since it reads all information on bus 5 into a register in cache 1 will be updated if that data word location is stored in cache 1. This assures that information stored at each address location in cache 1 is the same as information stored at the corresponding address location in main memory 3.

CPU 2 requests data from cache 1 by sending the requested address (PRA) over private interface 6 to cache 1. If the data is stored in cache 1, the requested data is sent back to CPU 2 from cache 1 over private interface 6. If the requested data is not in cache 1, cache 1 requests the data of main memory 3 over bus 5 and in addition cache 1 requests three additional data words from address locations PRA+1, PRA+2 and PRA+3 for the interleaved memory or one additional word of data from address location PRA+1 for the banked memory. When the data words are received from main memory 3 over bus 5 by cache 1, they are written into cache 1 and the requested data word is sent from cache 1 to CPU 2 over private interface 6.

CACHE SYSTEM

FIG. 2 shows the cache 1 system which includes a bus interface unit 10, a replacement and update unit 11, a cache directory and data buffer unit 12, an address control unit 13 and a private cache-CPU interface unit 6. FIG. 2 is made up of 4 sheets. The information flow is best seen with sheet 2 at the left, sheet 1 on the right, sheet 3 below sheet 1 and sheet 4 below sheet 3.

BUS INTERFACE UNIT 10—FIG. 2, Sheet 1

Bus interface unit 10, FIG. 2, comprises drivers 212, 214 and 218, receivers 213, 215 and 217, and system bus control logic unit 219.

Bus interface unit 10 connects to bus 5 through interface signal bus 4. Bus 5, interface signal bus 4 and system bus control 219 are disclosed by U.S. Pat. Nos. 3,993,981 entitled "Apparatus For Processing Data Transfer Requests In A Data Processing System", and 4,030,075 entitled "Data Processing Systems Having Distributed Priority Network" and will be described herein only as necessary to provide continuity to the description.

The 18 address leads BSAD05-22 are connected between bus 5 and the junction of the driver 212 and the receiver 213 of bus interface unit 10. The output of receivers 213, 215 and 217 connect to a First-In-First-Out (FIFO) buffer 203. The 20 bit data word lines BSDT A, B, 00-15, BSDP 00, 08 are connected to the junction of the driver 214 and receiver 215. A number of control signal lines are connected to the junction of the driver 218 and the receiver 217. These control logic signals master clear CLEAR-, Bus request BSREQT, data cycle now BSDCNN, bus acknowledge BSACKR, bus wait BSWAIT, BSAD 23, second half bus cycle BSSHBC and bus double pull BSDBPL input system bus control 219 through receiver 217 and are distributed to other logic control units which will be described infra as well as being sent out on bus 5 through driver 218.

The My Data Cycle Now logic signal MYDCNN connects between System Bus Control 219 and drivers 212, 214 and 218.

Signal bus BSAD 08-17, the output of receiver 213 connects to Cycle Control 232 of the Replacement and Update Unit 11. The output of an address register (AOR) 207 18 bit address BAOR 05-22 in the address control unit 13 connects to the input of driver 212. Cache identification code $0002_8$ and function code $00_8$ or $01_8$ are encoded on the input of a driver 214 whose output is connected to the bus 5 data lines BSDT A, B, 00-15. Logic circuit signals described infra are connected between other units of cache 1 and system bus control 219.

The receiver driver pairs 212 and 213, 214 and 215, and 217 and 218 are 26S10 circuits described on page 4–28 of the catalog entitled "Schottky & Low Power Schottky Bipolar Memory, Logic & Interface" Published by Advanced Micro Devices, 901 Thompson Place, Sunnyvale, California 94086.

REPLACEMENT AND UPDATE UNIT 11—FIG. 2, Sheet 3

The replacement and update unit 11 FIG. 2 includes the FIFO buffer 203, a local register (LR)204, buffer bypass drivers 205, FIFO R/W control 230, clock control 220 and cycle control 232.

Replacement and update unit 11 receives from Bus Interface Unit 10 the 18 bit update address BSAD 05-22, the 20 bit data word BSDT A, B, 00-15, BSDP 00, 08 and control signals all of which connect between FIFO 203 and their respective receivers 213, 215 and 217. An 18 signal line replacement address signal bus AOR 05-22 connects between the input of LR 204 and a replacement address file (RAF)206 output in address control unit 13. Signal busses FIFO 00-17, FIFO 19-38 and FIFO 18, 39-43 connect between the FIFO 203 output and LR 204 input. Also connected between the replacement and update unit 11 and the other units of cache 1 are control signals described infra.

A 20 bit data word signal bus DATA 00-19+ connects between the output of the buffer bypass driver 215 unit and a junction 216 in cache directory and data buffer unit 12. The 18 line update or replacement address signal bus FIFO 00-17+ connect between the output of LR 204 and one input of 2:1 MUX 208, and the 20 bit data output signal lines DATA 00-19− connect between the output of LR 204 and a cache data buffer 201. Read address counter output logic signal FRADDR and FRBDDR connect between FIFO R/W Control 230 and FIFO 203 as do write address counter output FWADDR and FWBDDR and Write Strobe signal FWRITE. Logic signal CYFIFO connects between FIFO R/W control 230, cycle control 232 and LR 204. Logic Signal FIFO 41+ connects between the FIFO bit position 41 output of FIFO 203 and FIFO read enable terminals for FIFO 00-17. Logic Signal FIFO 41− connect between the FIFO bit position 41 output of FIFO 203 and the RAF 206. FIFO 18, 42 and 43 connect between a Read Address Multiplexer 233 and their respective bit position outputs of FIFO 203. Logic Signal MEMREQ connects between cycle control 232, System bus control 219 and a 2:1 MUX 209 switch. CLOCK0+ connects between Clock Control 220, cycle control 232 and other logic units described infra. Logic signal NO HIT+ connects between FIFO R/W control 230, cycle control 232 and NAND 231 of cache directory and data buffer Unit 12. Logic signal REPLACE connects between the LR 204 output, a 2:1 MUX 223 switch and a Round Robin 224 logic unit. Logic signal FEMPTY− connects between FIFO R/W control 230 and Clock Control 220. Logic signal CACHRQ connects between interface 6 and Clock Control 220 and logic signal CYCADN connects to interface 6 from cycle control 232.

FIFO 203 is organized as four 44-bit registers made up of random access memory chips 74LS 670 described on page 7–526 of the TTL Data Book for Design Engineers, second edition, copyright 1976 by Texas Instruments of Dallas, Texas. LR 204 is a 44 bit register made up of conventional flip-flops using conventional design techniques. Address, data and control information are gated by logic signal busses FIFO 00-17, FIFO 19-38 and FIFO 18, 39-43 respectively. FIFO 19-38, the data signal bus is gated through buffer bypass drivers 205 by logic signal INTERG+ going high. Buffer bypass drivers 205 are made up of 74 367 circuits described on page 5–69 of the aforementioned TTL Data Book. FIFO R/W control 230 provides read address counter signals FRADDR and FRBDDR, write address counter signals FWADDR and FWBDDR, and a write strobe FWRITE to select the FIFO 203 registers for reading and writing. A FEMPTY− signal going high indicating that the FIFO buffer is not empty starts CLOCK0+ cycling in clock control 220. A FIFO 41+ signal low indicates that the LR 204 18 bit address field LR 0-17 will be filled from RAF 206 over the 18 line AOR 05-22 signal bus.

The replacement cycle is operative in response to the CPU 2 memory request logic signal CACHRQ. If the requested information is net in cache 1, a request for the information is sent by cache 1 to main memory 3 over bus 5. The requested information coming back from main memory 3 over bus 5 is sent to CPU2 and written into data buffer 201. This operation is called replacement.

Cache 1 reads all information on bus 5 into FIFO 203. If that information was to update main memory 3, then cache 1 checks to see if that main memory 3 address location is stored in the data buffer 201. If the information address location is stored in the data buffer 201, then the data word in that location is updated with the new information data word. This operation is called update. Co-pending related applications 1 and 3 listed supra disclose the FIFO 203 operation and the update operation in more detail.

CACHE DIRECTORY AND DATA BUFFER 12—FIG. 2, sheet 4

The cache directory and data buffer 12 comprises the data buffer 201, the directory 202, 4 comparators 221a–d, the 2:1 MUX 208, a round robin 224 logic unit, a 2:1 MUX 223, 18 inverters 225, 20 NAND gates each of 251a–t, 252a–t, 253a–t, and 254a–t, an AND gate 231 and the junction 216.

Signal busses are coded as follows in the specification and figures. For example, for row address ADDR 00-07-10, ADDR is the signal name. ADDR 00-07 refers to the 8 signal leads labeled ADDR 00, ADDR 01 ... ADDR07. ADDR 00-07− indicates that the signals are low if they indicate a "1" and high if they indicate a "0". ADDR 00-07-10 indicates that this signal bus 10 of 8 bit row address ADDR 00-07−.

Main memory 3 address BAOR 05-22+ signal lines connect between bus 6 and one input of 2:1 MUX 208 of the cache directory and data buffer unit 12. Address signal lines FIFO 00-17+, connect between the output of LR204 and the other input of 2:1 MUX 208. 2:1 MUX 208 output signal bus ADDR 00-17+ connects to 18 inverters 225 whose output ADDR 00-17-10 splits into row address ADDR 00-07-10 and column address ADDR 08-17-10. Row address ADDR 00-07-10 connects to directory 202 and to one input each of 4 comparators 221a–d. Column address ADDR 08-17-10 connects to the data buffer 201 and directory 202 and column address ADDR 08-17+ connects to round robin 224. Row addresses ADDR 00-07-20, −21, −22 and −23 connect to the second input each of 4 comparators 221a–d and logic signals HIT 0-3+ connect to an input of a 2:1 MUX 223 and also to one input each of 20 NAND 251a–t circuits, 20 NAND 252a–t circuits, 20 NAND 253a–t circuits and 20 NAND 254a–t circuits. Logic signal WRTPLS− connects to the enable terminal of 2:1 MUX 223. The round robin 224 output, LEVEL 0-3+ connects to the second input of 2:1 MUX 223. The output of 2:1 MUX 223, the 4 logic signals WRITE 0-3 each connects to their respective level 0-3 of data buffer 201. The outputs of data buffer 201 20 bit signal busses CADP 00-19 -10, -11, -12 and -13 connect to the second input and logic signal INTERG— connects to the third input of NAND 251a-t, 252a-t, 253a-t and 254a-t whose respective output signal busses CADP 00-19+ connect to junction 216. Data word signal bus CADP 00-19+ connect between junction 216 and interface 6. The output signals HIT 0-3+ connect to the input of NAND 231, the output of which connects to cycle control 232 and FIFO R/W control 230. 2:1 MUX's 208 and 223 are switched by logic signals ADDRS0+ and REPLACE respectively. Logic signal REPLACE connects to round robin 224.

Data buffer 201 is organized in four levels, each level storing 1,024 data words in 1,024 word locations addressed by 10-bit column address ADDR 08-17-10. Four words, one from each level, CADP 00-19-10, -11, -12, and -13 are read out of data buffer 201 when the data buffer 201 is addressed. Directory 202 is also organized in four levels of 1,024 memory locations in each level. Each memory location stores an 8 bit row address. When 10 bit column address ADDR 08-17-10 inputs directory 202, four 8 bit row addresses ADDR 00-07-20, -21, -22 and -23 are read out of the four levels of directory 202 to four comparators 221a-d. These row addresses are compared with the input row address ADDR 00-07-10 and if there is an equal, in a replacement mode, that "hit" line HIT 0+, HIT 1+, HIT 2+ or HIT 3+ goes high gating the 20 bit output of data buffer 201 through the appropriate 20 circuits of NAND 251a-t, 252a-t, 253a-t, or 254a-t to junction 216 and to CPU2.

If a data word in data buffer 201 is to be replaced, round robin 224 selects the directory 202 and data buffer 201 level for replacement by setting one of the level signals LEVEL 0-3+ high. 2:1 MUX selects this signal since logic signal REPLACE is high and logic signal WRTPLS— enables 2:1 MUX 223.

In an update mode the selected hit line HITo-3+ is switched through 2:1 MUX 223 and inverted by inverter 255 to enable the selected level of data buffer 201 to write the data word DATA 00-19— into the selected column address ADDR 08-17-10. 2:1 MUX 223 is enabled by logic signal WRTPLS—.

Round robin 224 has two, one bit by 1024 address random access memories (RAM). For each address location, there is stored 2 bits in each RAM which when decoded selects the next level of that column address to be replaced.

The directory 202 and data buffer 201 are designed using random access memory chips 93 LS 425 and round robin 224 is designed using random access memory chips 93 415, described on pages 7-119 and 7-70 respectively in the Bipolar Memory Data Book, copyright 1977, by Fairchild Camera and Instrument Co. of Mountain View, California. Comparator 221a-d logic circuits are made up of Fairchild TTL/MSI 93S47 high speed 6 bit identity comparator circuits. 2:1 MUX 208 and 223 are 75S157 logic circuits described on page 7-181 of the aforementioned TTL Data Book. The round robin 224 operation is described in copending related application No. 2 listed supra.

ADDRESS CONTROL UNIT 13—FIG. 2, SHEET 2

Address control unit 13 includes the address register AOR 207, the replacement address file RAF 206, an adder 211, an OR gate 236, an AND gate 240, a NAND gate 241, an EXCLUSIVE OR gate 237, a 2:1 MUX 209, the read address multiplexer 233, a write address counter 234, and an AOR and RAF control unit 235. CPU2 address signal lines BAOR 05-22+ connect between interface 6 and one input of 2:1 MUX 209. Logic signal MEMREQ connects between cycle control 232 and the select terminal of 2:1 MUX 209. Logic signal MEMREQ— and CYQLTO— connect between cycle control 232 and inputs to a NAND 241 whose output connects to the select input of 2:1 MUX 209. The output of adder 211 signal lines AOR 05-22+ connects to the other input of 2:1 MUX 209 whose output signal lines BAOR 05-22 connects to the inputs of AOR 207 and RAF 206. Signal bus 05-22 +10 connect between the output of AOR 207 and the inputs to adder 211 and driver 212. AOR 207 is organized as an 18 bit register made up of conventional flip-flops. RAF 206 is organized as four 18 bit registers and is designed using the aforementioned random access memory chips 75 LS 670. The logic signals ADDRR0 and ADDRR1 connect between the write address counter 234 and RAF 206, AOR and RAF control 235, AND gate 236 and EXCLUSIVE OR gate 237. Logic signal CYQLTO— connects between cycle control 232 and an input to AND 236. The output of AND 236 connects to the +2 terminal of ADDER 211. The output of EXCLUSIVE OR 237 connects to the input of OR 240 whose output connects to the +1 terminal of ADDER 211. Logic signal CYQLTO+ connects between cycle control 232 and the other input of OR 240. Logic signals ADDRWD+0B and ADDRWD+0A connect between the read address multiplexer 233 and RAF 206. An AORCNT logic signal connects between AOR and RAF control 235 and write address counter 234. Logic signals BAWRIT and BAORCK connect between AOR and RAF control 235 and RAF 206 and AOR 207 respectively.

Figure 8:
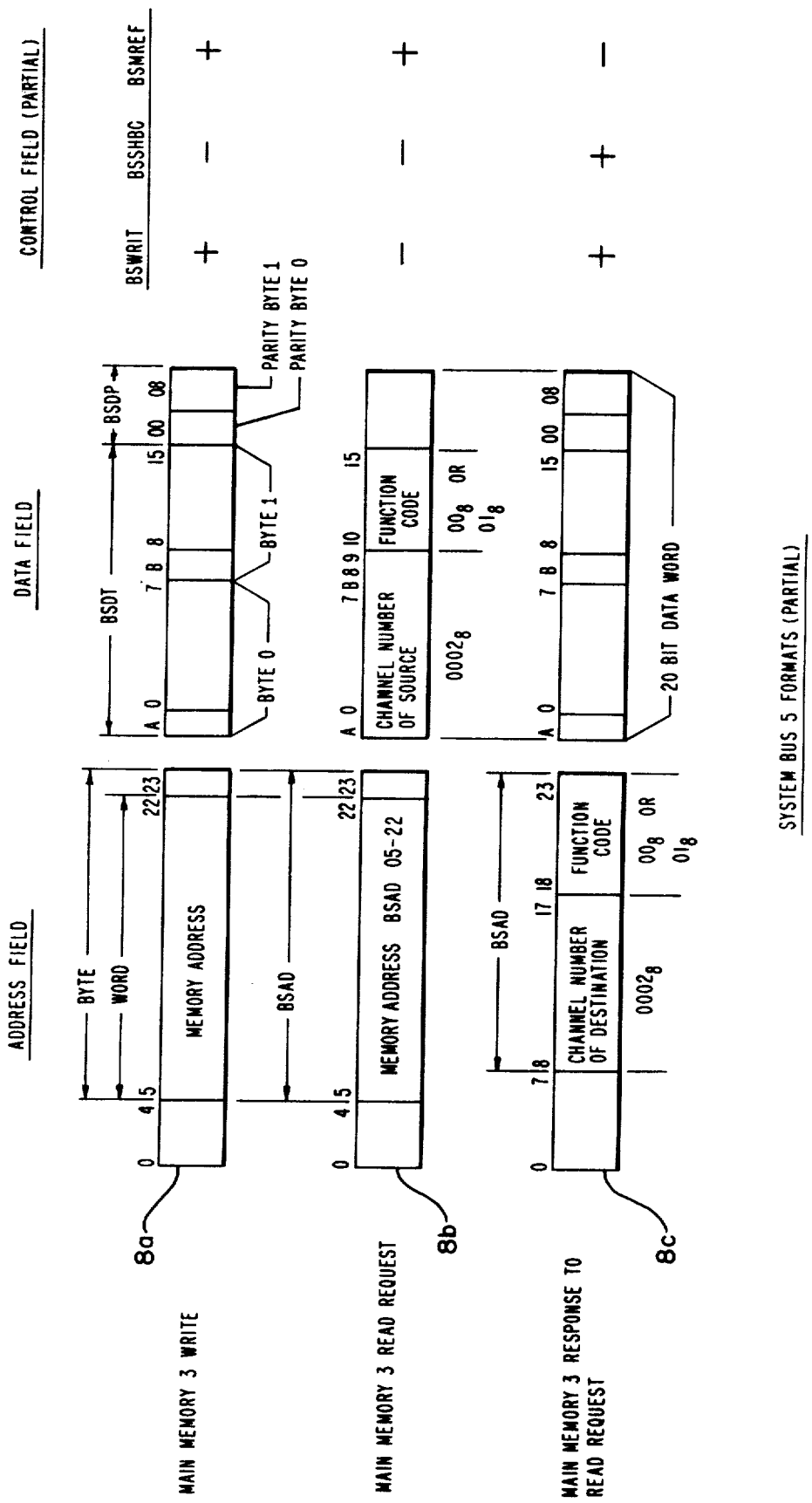
FIG. 8 shows the system bus formats.

For the interleaved memory operation the address control unit 13 logic loads AOR 207 with PRA, the CPU memory request address to send out on bus 5 to main memory 3 in a format 86 of FIG. 8 during a first memory request cycle. AOR 207 is then loaded with PRA+1 which is the memory request address sent out on bus 5 to main memory 3 in the format of FIG. 8b during the second memory request cycle. RAF 206 is loaded with PRA, PRA+1, PRA+2 and PRA+3 in successive locations under control of write address counter 234, adder 211 and AOR and RAF control 235. These addresses are supplied to the address field of LR 204 when information in the format of FIG. 8c are sent from main memory 3 to cache 1 over bus 5. For the banked memory operation, the address control unit 13 logic loads AOR 207 with PRA, the CPU2 memory request address which is sent out on bus 5 to main memory 3 in a format 86 of FIG. 8 during the memory request cycle. RAF 206 is loaded with PRA and PRA+1 in successive locations under control of the write address counter 234. These addresses are supplied to the address field of LR204 when information in a format 8c of FIG. 8 are sent from main memory 3 to cache 1 over bus 5. The read address multiplexer 233 selects the RAF 206 address location to be read out of LR 204 for each main memory 3 response over bus 5 to the read request of cache 1. The adder 211 output signal lines AORO 05-22+ provide the address stored in AOR 207 incremented by +1 or +2 under control of AND 236 and 237. If the write address counter 234 is set at location 03, logic signals ADDRR0+ and ADDRR1+ are high, therefore AND 236 enables the +2 input of adder 211. If the write address counter is set at locations 01 or 02 then the output of EXCLUSIVE OR 237 enables the +1 input to adder 211. The adder 211 is a 74 283 logic circuit described on page 7-415 of the aforementioned TTL Data Book.

During the QLT mode the logic signal CYQLTO− input to AND 236 is low keeping the +2 input to adder 211 low. Logic signal CYQLTO+, the input to OR 240 enables the +1 input to ADDER 211.

CACHE CPU INTERFACE UNIT 6

Cache CPU Interface Unit 6 includes an 18 line address signal bus BAOR 05-22, a 20 line data signal bus CADP00-19 and a control signal bus containing a number of signal lines. The functions of the control signal lines CACHRQ the cache request logic signal and CYCADN, the cache done logic signal, are described herein. Cache CPU interface unit 6 is fully described in copending related application No. 8 listed supra.

SYSTEM BUS 5 CONTROL SIGNALS

The signals listed below are the bus 5 control signals necessary to describe the invention. The aforementioned U.S. patent references fully describe all of the control signals associated with bus 5.

Memory Reference (BSMREF)

BSMREF high indicates that the address loads BSAD 05-22 contain a memory 3 word address.

BSMREF low indicates that the address leads BSAD 08-23 contain a channel address and a function code.

Bus Write (BSWRIT)

BSWRIT high indicates that a master unit is requesting a slave unit to execute a write cycle.

Second Half Bus Cycle (BSSHBC)

BSSHBC high indicates that main memory 3 is sending to cache 1 information previously requested by cache 1.

Double Pull (BSDBPL)

BSDBPL is high when sent from cache 1 to main memory 3 to signal main memory 3 to read data in double pull mode.

BSDBPL is high when sent from main memory 3 to cache 1 with the first word of a two word response to a memory request.

BSDBPL is low when sent from main memory 3 to cache 1 with the second word of a two word response to the memory request.

This enables main memory 3 to send one or two words to cache. If, for example, PRA is the high order address of a memory bank then BSDBPL will be low indicating that only one word will be transferred in response to the memory request.

My Acknowledge (MYACKR)

MYACKR when high is sent by cache 1 to system bus 5 to indicate that cache 1 is accepting a system bus 5 data word transfer from main memory 3.

My Bus Request (MYREQT)

MYREQT when high is set by cache 1 to system bus 5 to indicate that cache 1 is requesting the system bus 5 cycle.

My Data Cycle Now (MYDCNN)

MYDCNN high indicates that cache 1 is transferring information over system bus 5 to main memory 3.

Data Cycle Now (BSDCNN)

BSDCNN high indicates that main memory 3 has placed information on the bus 5 for use by cache 1.

Acknowledge (BSACKR)

BSACKR high indicates a cache 1 that main memory 3 has accepted the memory request sent by cache 1.

Wait (BSWAIT)

BSWAIT high indicates to cache 1 that main memory 3 is busy and cannot accept the memory request at this time.

Bus Request (BSREQT)

BSREQT high indicates to cache 1 that a system coupled to bus 5 has requested a bus cycle.

Byte Mode (BSBYTE)

BSBYTE high indicates a byte transfer rather than a word transfer.

Master Clear (CLEAR−)

CLEAR− low initializes the cache by resetting the logic. When CLEAR− rises the QLT operation is started.

CLOCK CONTROL 220—FIG. 3, Sheet 2

The cache request logic signal CACHRQ, FIG. 3, connects to a RESET terminal of a flop 301 and to an input terminal of a NAND 302. A clock signal CLOCK0+ connects to the CLK terminal of flop 301. The $\overline{Q}$ output of flop 301 connects to the second input of NAND 302. The CPUREQ+0A output of a NAND 306 connects to the third input of NAND 302 whose output connects to an input of 30 ns delay line 303 and an input of NAND 304. The output of delay line 303 connects to the other input of NAND 364. The Q output of flop 301, logic signal BLKREQ+ connects to a D and RESET input of flop 305. The logic "1" signal connects to the SET input of flop 305. The MYACKR logic signal connects to the CLK input of flop 305. The Q output signal INTERG+ connects to buffer bypass drivers 205 and the $\overline{Q}$ output signal INTERG− connects to the input of the HIT0-3+ NAND gates 251a-t, 252a-t, 253a-t and 254a-t in the cache directory and data buffer unit 12. Logic signal FEMPTY-20 connects to an input of AND 324 and to the input of inverter 307. A logic signal MEMREQ connects to an input of NAND 306. A logic signal ADDRSO−, the $\overline{Q}$ output of flop 309 connects to another input of NAND 306. Logic signal CYQLTO+ connects between cycle control 232 and the third input of NAND 306. Logic signal ADDRSO+, the Q output of flop 309 connects to the select input of 2:1 MUX 208 in cache directory and data buffer unit 12. The output of NAND 308 connects to the SET terminal, CLOCK0+ connects to the CLK terminal and a general clear CLEAR signal connects to the reset terminal of flop 309. Logic signals CYFIFO+0A and CYWRIT+0A connect to respective inputs of NAND 308. A CPUREQ logic signal connects to the NAND 304 output to a SET terminal of flop 313. An FEMPTY− logic signal connects to a RESET terminal of flop 313 from an inverter 319 output. A $\overline{Q}$ output terminal logic signal FEMTPY+20 and a Q output logic signal FEMPTY-20 of flop 313 connect to the respective input of a NOR 310. A CYREAD logic signal connects between the Q output of a flop 330 and the third input of NOR 310 and CLOCK0+ connects to the fourth input of NOR 310. The output of NOR 310 connects to an input of NOR 311. The CLOCK0+ connects to an inverter 312 input. A CLOCK0− input signal of inverter 312 connects to an input of NAND 315.

Clock control 220 provides a timing signal CLOCK0+ to time the logic circuits of cache 1. CLOCK0+ starts cycling on either a CPU2 memory request or by FIFO 203 being loaded with information from bus 5. In the case of the CPU2 memory request, logic signal CACHRQ, the input to NAND 302 is forced high, which sets the output low. The other two inputs to NAND 302 BLKREQ− and CPUREQ+0A are high at this time. Flop 301 is not set so the $\overline{Q}$ output is high and both inputs to NAND 306 are low so the output is high. When the output of NAND 302 goes low, one input of NAND 304 goes low and 30 nanoseconds later the other input goes low due to the delay in delay line 303. The delayed signal low sets logic signal CPUREQ high. Logic signal CPUREQ the SET input of flop 313 high sets the Q output FEMPTY-20 low. Flop 313 is a 74S74 logic circuit which has both the Q and $\overline{Q}$ outputs high when both the SET and PRESET inputs are low. FLop 74S74 is described on page 5-22 of the aforementioned TTL Data Book.

The logic signal FEMPTY-20 low sets the output of NOR 310 high forcing the timing signal CLOCK+ output of NOR 311 low. Fifty nanoseconds later, the output of delay line 314 forces the other input of NOR 311 low forcing timing signal CLOCK0+ high. Timing signal CLOCK0+ going high sets flop 301 setting the $\overline{Q}$ output logic signal BLKREQ− low. This forces the output of NAND 302 high, forcing the NAND 304 output logic signal CPUREQ, the SET input to flop 313, low. This sets flop 313 and logic signal FEMPTY-20 is forced high keeping the timing signal CLOCK0+ output of NOR 311 high. Timing signal CLOCK0+ remains high as long as logic signal CACHRA remains high. Logic signal CACHRQ will remain high until CPU2 receives the requested data word and the cache done logic signal CYCADN is sent to CPU2.

Flop 313 which controls the start of cycling of CLOCK0+ is also controlled by the loading FIFO 205. The write address counter flops 316 and 317 in FIFO R/W control 230 advance to the next location after receiving acknowledged information from bus 5 (BSACKR high). This sets the output of comparator 318, logic signal FEMPTY+ low, setting the inverter 319 output logic signal FEMPTY− high. With the RESET input logic signal FEMPTY− of flop 313 high, the $\overline{Q}$ output logic signal FEMPTY+20 goes low starting the timing signal CLOCK0+ cycling as before. In this case, timing signal CLOCK0+ cycles as long as there is information in FIFO 203, and logic signal FEMPTY− keeps going low and logic signal CYREAD the input to NOR 310 is low. CPUREQ+0A output logic signal from NAND 306 stays low as long as the MEMREQ or ADDRS0− inputs to NAND 306 are high. This prevents a second CPU2 memory request cycle if logic signal CACHRQ is again high until the responses to the main memory 3 requests as a result of a previous CPU2 memory request is sent to cache 1. The CYQLTO+ logic signal input to NAND 306 high prevents a cache request cycle during the QLT mode. MYACKR logic signal going high at the start of the main memory 3 responses to the CPU2 memory request sets flop 305, setting logic signal INTERG+ high to gate buffer bypass drivers 205 to send the CPU2 requested data (PRA) directly out on interface 6. INTERG− when high gates NAND 251a-t, 252a-t, 253a-t and 254a-t in cache directory and data buffer 12 to allow the selected word from data buffer 201 to be sent to CPU2 if the data word was stored in data buffer 201 when logic signal CACHRQ was set high. The logic signal FEMPTY+30 input to the SET terminal of flop 301 assures that the flop 301 does not set when logic signal CACHRQ comes high during a FIFO 203 cycle. Flops 301, 305 and 313 are 74S74 logic circuits described on page 5-22 of the aforementioned TTL Data Book. Flop 309 is a 74S175 logic circuit described on page 5-46 of the TTL Data Book.

DETAILED DESCRIPTION OF FIFO R/W CONTROL 230-FIG. 3, SHEETS 1 & 2

In FIG. 3, the output of a NAND 324 connects to the SET input, a general clear signal CLEAR connects to the RESET input and timing signal CLOCK0+ connects to the CLK input of a flop 323. The Q output logic signal CYFIFO connects to a NAND 315 input. Timing signal CLOCK0− connects between the inverter 312 output and the other input of NAND 315. The Q output, logic signal CYFIFO also connects to cycle control 232. The $\overline{Q}$ output connects to the input of AND 324. Logic signal FEMPTY-20 connects to the other input of AND 324. A BUMPUP logic signal output of NAND 315 connects to the CLK inputs, and CLEAR connects to the RESET inputs of flops 36 and 317. The logic "1" signals connect to the J, K and PRESET inputs to flop 316, and the PRESET input of flop 317. The Q output of flop 316 cionncts to the J and K inputs of flop 317 and to a comparator 318 input. The Q output of flop 317 connects to comparator 318. The $\overline{Q}$ outputs of flop 316 and 317 connect to the read address select terminals of FIFO 203. A MYACKR+ logic signal and a BSSHBC logic signal connect to NAND 322 whose output, logic signal F plus 1 connects to the CLK inputs of flops 320 and 321. CLEAR logic signals connect to the RESET inputs of flops 320 and 321. Logic "1" signals connect to the J, K and PRESET inputs of flop 320 and the PRESET input of flop 321. The Q output of flop 320 connects to comparator 318 and the J and K input of flop 321. The Q output of flop 321 connects to comparator 318. The $\overline{Q}$ outputs of flops 320 and 321 connect to the write address select terminals of FIFO 203. FIFO 41+ logic signal connects to the read enable terminals of address field FIFO bit positions 00-17 of FIFO 203. A ground signal connects to the read enable terminals of the data and control field FIFO bit positions 18-43 of FIFO 203. FIFO 41+ connects to the SET input of LR 204 replace-update bit position 41 flop. Logic signals CYFIFO and REPLACE connect to input terminals of NOR 325 whose output connects to a NOR 327, whose output logic signal CYWRIT+DA connects to the SET input of flop 330 and an input of NAND 308. Timing signal CLOCK0+ connects to the CLK terminal, and CLEAR connects to the RESET terminal of flop 330 whose $\overline{Q}$ output logic signal CYREAD connects to round robin 224 and an input to NOR 310. Logic signal BSDCNN+ connects to the input of an inverter 326 whose output connects to the inputs of delay lines 328 and 329. Delay line 328 output connects to an input of inverter 331 whose output connects to an input of NAND 332. The output of delay line 329 connects to the other input of NAND 332 whose output logic signal FWRITE connects to the write enable terminal of FIFO 203. Logic signal NOHIT+ connects to an input of inverter 334 whose output logic signal NOHIT− connects to an input of a NOR 340 and to an input of NOR 333 whose output connects to the other input of NOR 327. Logic signals CYFIFO and UPDATE connect to the other inputs of NOR 333. Logic signal CYQLTO− connects between cycle control 232 and the input to NOR 340 whose output connects to an input of NOR 325.

Logic signal BSDCNN+ goes high at the start of every main memory 3 to cache 1 data transfer cycle, is inverted by inverter 326, is delayed 10 nanoseconds by delay line 328, and is again inverted by inverter 331 appearing at the first input of NAND 332 as a delayed positive logic signal. The output of delay line 329 is a negative going logic signal appearing at the second input of NAND 332 delayed 40 nanoseconds. The 2 inputs to NAND 332 are positive for 30 nanoseconds forcing the FWRITE write enable input to a negative going pulse 30 nanoseconds wide, delayed 10 nanoseconds from the rise of BSDCNN+. This strobes the bus 5 information at the output of receivers 213, 215 and 217 into a location of FIFO 203 defined by the $\overline{Q}$ outputs of the write address flops 320 and 321 logic signals FWADDR− and FWBDDR−. MYACKR goes high, if a cachde identification AND 546 output, FIG. 5, goes high indicating that cache ID 0002$_8$ was received from bus 5 through receiver 213 and that this is not a main memory 3 write operation. When BSDCNN+ delayed 60 nanoseconds goes high, flop 516 sets and logic signal MYACKR, the input to NAND 322 goes high. Since this is a response to a memory request, BSSHBC is high forcing the output of NAND 322 logic signal F PLUS 1 low. Forcing the CLK inputs of flops 320 and 321 low increments the write address counter flops 320 and 321. Since the output logic signals FWADDR+ and FWBDDR+, of the write address counter flops 320 and 321 and logic signals FRADDR+ and FRBDDR+, outputs of the read address counter flops 316 and 317 are no longer equal, logic signal FEMPTY+, the output of comparator 318 goes low, starting CLOCK0+ cycles as previously described in Clock Control 220.

Write address counter flops 320 and 321 and read address counter flops 316 and 317 are conventional JK flops 74S112 described on page 5-24 of the aforementioned TTL Data Bok and they operate in the following manner. Assume flops 320 and 321 are both reset, this is the $\overline{Q}$ outputs FWADDR− and FWBDDR− are high. When FPLUS 1 goes low, flop 320 sets on the fall of logic signal FPLUS 1. The Q output of flop 320 being low keeps flop 321 reset. With flop 320 set and its $\overline{Q}$ output high, flop 320 resets and flop 321 sets on the next fall of logic signal FPLUS 1. On the next fall of logic signal FPLUS 1, both flops 320 and 321 are set and on the fourth fall of logic signal FPLUS 1, both flops are reset. The rise of CLOCK0+ sets flop 323 and its Q output, logic signal CYFIFO goes high. When CLOCK0+ next goes low, both logic signals CYFIFO and CLOCK0− input to NAND 315, go high forcing the output logic signal BUMPUP low, advancing the read address counter flops 316 and 317. The inputs to comparator 318 signals FWADDR+ and FWBDDR+ equals signals FWRDDR+ and FRBDDR+ thereby setting FEMPTY+ high stopping of timing signal CLOCK0+ from cycling if no bus 5 cycle logic signal BSDCNN+ is present. Logic signal FEMPTY+ is inverted by inverter 319 and the output logic signal FEMPTY− going low sets the FEMPTY+20 output of flop 313 high, forcing the output of NOR 310 low, forcing the CLOCK0+ output of NOR 311 high. Logic signal CYFIFO, FIG. 2, going high sets the FIFO 203 output of the location indicated by the read address counter flops 316 and 317 (FRADDR− and FRBDDR−) into LR 204. If the information in FIFO 203 was a response to a memory request, FIFO 41+ is high. This sets LR 204, F/F 41, FIG. 3, so that its Q output, logic signal REPLACE is high. The output of NOR 340 is high during the QLT mode since the logic signal CYQLTO− is low. This sets the output of NOR 325 low and the output of NOR 327 high, so that at the next rise of CLOCK0+, flop 330 sets and the Q output logic signal CYWRIT goes high and continues cycling under control of the logic signal CYFIFO input to NOR 325 for the remainder of the QLT operation.

During normal operation, logic signal CYQLTO−, the input to NOR 340 is high. Therefore, in a replacement mode with logic signals REPLACE and CYFIFO high if the directory 202 search results in a "NO HIT", then the 3 inputs to NOR 325 are high and logic signal CYWRIT, the Q output of flop 330 goes high as before. Flop 309 of clock control 220 was previously set since CYWRITE+0A and CYFIFO+0A were low in previous cycles setting the Q output ADDRSO+ high, switching 2:1 MUX 208 FIG. 2, to receive memory address BAOR 05-22+. At the rise of CLOCK0+, logic signal CYFIFO+0A is high, since flop 323 is not set and the $\overline{Q}$ output which is high inputs AND 324. The FEMPTY-20 input to AND 324 is also high, forcing the CYFIFO+0A input to NAND 308 high, setting the output low. Since the SET input to flop 309 is low, the Q output ADDRS0+ goes low, switching 2:1 MUX 208, FIG. 2, to receive the FIFO 00-17+ address output from LR 204. Flop 323 when set is reset on the next rise of CLOCK0+ since the $\overline{Q}$ output which inputs AND 324 is low, forcing the SET input of flop 323 low, resetting flop 323 and the Q output logic signal CYFIFO goes low.

During an update operation logic signal UPDATE, an input to NOR 333 is high. If the directory 202 indicates a "hit" then the output of inverter 334, logic signal NO HIT− is high. When logic signal CYFIFO is high the 3 inputs to NOR 333 are high forcing the output low forcing the output of NOR 327 high. At the next rise of timing signal CLOCK0+ flop 330 sets as before indicating a cache write cycle.

Flops 323 and 330 are 74S175 logic circuits described on page 5-46 of the aforementioned TTL Data Book.

DETAILED DESCRIPTION OF AOR AND RAF CONTROL 235

FIG. 4, SHEET 1

READ ADDRESS MUTLIPLEXER 223 AND WRITE ADDRESS COUNTER 234

FIG. 4, SHEET 2

The outputs of a NAND 417 and 418 connects to NOR 419 inputs. Logic signal BLOCKF connects between a NAND 417 and cycle control 232. Logic signal FEMPTY-20 connects between clock control 220 and an input to a NOR 442 whose output connects to the 3rd input of NOR 419. The output of NOR 419, logic signal AORCNT, connects to the inputs of delay lines 420 and 421, an input of a NAND 424 and an input to a NAND 416. Logic signals MEMREQ— and CYQLTO+ connect between cycle control 232 and inputs to a NAND 441. Logic signal CYFIFO connects between FIFO R/W control 230 and another input of NAND 441 whose output connects to an input of NOR 442. Logic signals CYQLTO-1A and CYQLTO-0B connect between cycle control 232 and inputs to a NAND 443 whose output connects to an input of NOR 419.

The output of NAND 424, logic signal BAORCK connects to the AOR 207. The delay line 421 output connects to an inverter 423 input whose output logic signal AORCNT-30 connects to the CLK inputs of flip 426 and 427. The delay line 420 output connects to an inverter 422 input whose output connects to inputs of NAND 416 and NAND 424. Logic signal BAWRIT connects between the output of NAND 416, the input of NAND 425, and the WRITE strobe terminal of RAF 206. Logic signal MEMREQ connects to NAND 425 input, the RESET input flops 412 and 413 and cycle control 232. The output of NAND 425 connects to the reset terminals of flops 426 and 427 and the J and K inputs of flop 427. The Q output of flop 426, logic signal ADDRR0+ connects to the Write Address terminal 2 of RAF 206 and connects to the input of NAND 418. Logic signal MYACKR connects between another input of NAND 418 and cycle control 232. The Q output of flop 426 logic signal ADDRR0— connects to the inputs of NAND 417 and NAND 424. The Q output of flop 427, logic signal ADDRR1+ connects to the Write Address Terminal of RAF 206 and the input of NAND 417. Logic signal BSDCND+ connects between cycle control 232 and the CLK terminal of a flop 409. Logic signal BSAD 23+ connects to the SET input of flop 409 and the output of Receiver 217. Logic signal MYACKD connects between cycle control 232 and input of NAND 410 and 411. The Q output of flop 409, logic signal BSAD 23+10, connects to the other input of NAND 410. The $\overline{Q}$ output of flop 409, logic signal BSAD 23-10, connects to the other input of NAND 411. The output of NAND 410 connects to the CLK terminal of flop 412 and the output of NAND 411 connects to the CLK terminal of flop 413. Logic "1" signal connects to the PRESET, J and K terminals of flops 412 and 413. The Q output of flop 412, logic signal FCHONE+ connects to the input of FIFO bit position 43 of FIFO 203, FIG. 4. The Q output of flop 413, logic signal FCHZRO+, connects to the input of the FIFO bit position 42 of FIFO 203. Logic signal BSAD23+ connects to the input of the FIFO bit position 18 of FIFO 203. The output of the FIFO bit position 18 connects to a select terminal 1 of MUX 414 and 415. The MUX's are 74 S153 dual 4 lines to 1 line Data Selectors/Multiplexers described on page 5-42 of the aforementioned TTL Data Book. Terminal 1 of a Banked-interleaved select switch 407 is connected to ground. Terminal 2 is connected to logic "1". Logic signal BANKED+ connects between terminal 3 and an input to NOR 408 whose output logic signal ADDRWD+ connects to select terminal 2 of 4:1 MUX 414 and 415. Logic signal CYQLTO— connects between Cycle Control 232 and the other input of NOR 408. Logic signal BANKED+ also connects to cycle control 232. The enable input and the terminal 2 input of 4:1 MUX 414 are connected to ground as is the enable input and the terminal 0 input of 4:1 MUX 415. Input 3 of 4:1 MUX 414 and input 1 of 4:1 MUX 415 are connected to logic "1". Input 0 of 4:1 MUX 414 and input 2 of 4:1 MUX 415 connect to the FIFO bit position 42 output of FIFO 203 and input 1 of 4:1 MUX 414 and input 3 of 4:1 MUX 415 connects to the FIFO bit position 42 output of FIFO 203. The outputs of MUX 414 and 415, logic signals ADDRWD+0B and ADDRWD+0A connect to the Read Address terminals 1 and 2 respectively of RAF 206 and also connect to cycle control 232. Logic signal FIFO 41— connects to the read enable input of RAF 206. Logic signal BSDCNB+ connects between the RESET input of flop 409 and cycle control 232.

When CACHRQ, FIG. 3, goes high indicating that CPU2 is requesting a data word and CPU2 also sends the main memory 3 address location BAOR 05-22+, FIG. 2, of the requested data word, the address BAOR 05-22 (PRA) appears at the inputs of AOR 207 and location 00 of RAF 206. In addition, the address is sent to directory 202 and data buffer 201 as row address ADDR00-07-10 and column address ADDR 08-17-10. 2:1 MUX 208 is switched by ADDRSO+ high to input BAOR 05-22+ and a directory 202 search is started. When FEMPTY-20, the output of flop 313, FIG. 3, goes low the AORCNT output of NOR 419, FIG. 4, goes high, setting one input to NAND 416 and 424 high. Since the other inputs to NAND 416 and 424 are high logic signals BAWRIT and BAORCK go low. 50 nanoseconds later the output of delay line 420 goes high setting the output of inverter 422 low, setting the outputs of NAND 416 and 424 logic signals BAWRIT and BAORCK high. PRA is strobed into AOR 206 and into location 00 of RAF 206 when BAWRIT and BAORCK are low. Logic signal AORCNT going high is delayed 70 nanoseconds by delay line 421 and is inverted by inverter 423. Inverter 423 output logic signal AORCNT-30 going low advances Write Address Counter 234 to location 01. The Write Address Counter is made up of JK flops 426 and 427 whose operation has been described supra. Logic signal ADDRR1+ is now high and ADDRR0+ is low setting the Write Address in RAF 206 to location 01. Assuming the data requested by CPU2 of Cache 1 is not stored in Cache 1 then MEMREQ+, FIG. 5, is forced high. In FIG. 2 logic signal MEMREQ— low forces the output of NAND 241 high which transfers 2:1 MUX 209 to receive the AORO05-22+ output of ADDER 211. Since logic signal ADDRR1+ is high and logic signal ADDRO+ is low, the +1 output of EXCLUSIVE OR 237 is high forcing PRA+1 on the address signal lines AORO05-22+ and on the 2:1 MUX 209 output signal lines BAOR 05-22.

During normal operation for both banked and interleaved memories the first memory request is sent to main memory 3 over bus 5 and an acknowledge signal BSACKR returned by man memory 3 to cache 1 over bus 5 sets logic signal BLOCKF+ high, FIG. 5. When BLOCKF+ goes high the 3 inputs to NAND 417, FIG. 4, are high setting the output low. This sets the output of NOR 419 logic signal AORCNT high, which sets logic signal BAWRIT the RAF 206 write strobe, and logic signal BAORCK, the AOR 207 strobe, low as described supra, setting PRA+1 into AOR 207 and location 01 of RAF 206. Logic signal AORCNT-30 going low as before advances the write address counter 234 to location 02. For location 01 logic signal ADDRR1+ high and logic signal ADDRO+ is set low. The fall of logic signal AORCNT-30 sets logic signal ADDRR0+ high and sets ADDRR1+ low and the Write Address Counter 234 addresses location 02. The banked memory system now awaits the main memory 3 response to the first memory request whereas the interleaved memory system sends a second memory request.

At the end of the second memory request cycle logic signal MYACKR+, FIG. 5, goes high to start the first main memory 3 to cache 1 data response cycle. Since logic signal ADDRR0+ is also high the output of NAND 418 goes low setting logic signal AORCNT, the output of NOR 419 high. As previously described, logic signal BAWRIT goes low setting PRA+2 into location 02 of RAF. In FIG. 2, PRA+1 remains stored in AOR 207. When the Write Address Counter 234 is set at location 02 the output logic signals ADDRR0+ high and ADDRR1+ low results in the +1 output from EXCLUSIVE OR 236 going high. This results in forcing the output of ADDER 211, PRA+2 on the address signal line, AORO 05-22+ and BAOR 05-22, the output of 2:1 MUX 209. Note that logic signal BAORCK the write strobe for AOR 207 is not set low since the logic signal ADDRR0− input to NAND 424 is low. The Write Address Counter 234 is advanced to location 03 when AORCNT-30 goes low as described supra and logic signals ADDRR0+ and ADDRR1+ are both set high. This results in the +2 output of AND 236, FIG. 2, going high which sets the output of ADDER 211 to PRA+3. Logic signal MYACKR again comes high at the start of the second main memory 3 to cache 1 data word cycle in response to the first memory request again forcing logic signal AORCNT high. This forces logic signal BAWRIT low thereby forcing PRA+3 into location 03 of RAF 206 and advancing the Write Address Counter 234 to location 00.

For an interleaved memory 4 data words are transferred from main memory 3 to cache 1 over bus 5 on 4 separate bus 5 cycles. FIG. 8c shows the format of the responses. The low order bit BSAD23 of the Function Code identifies whether the data word is in response to the first memory request or the second memory request for data words. Logic signal BSAD 23+ and the Function Code history flops 412 and 413 identify the location of RAF 206 that stores the main memory 3 address for the data word being transferred. The first data word is at the PRA main memory 3 location and transfers from main memory 3 cache 1 with the Function Code set to $00_8$. BSAD 23+ the low order bit of Function Code $00_8$ is low and sets into FIFO bit position 18 of FIFO 203 FIG. 2, when the FIFO strobe FWRITE− goes low. Also, at this time the function history flops 412 and 413 are not set and the output logic signals FCHZRO+ and FCHONE+ are low setting the FIFO 42 and FIFO 43 bit positions low. With Switch 407 set to interleaved, the input to inverter 408 logic signal BANKED is low setting the output logic signal ADDRWD+ high, setting the SELECT terminal 2 high. This sets the 2 and 3 input terminals of 4:1 MUX 414 and 415 active. FIFO 18 sets SELECT terminal 1 of 4:1 MUX 414 and 415 low setting input 2 active. Since FIFO 42 is low the outputs of 4:1 MUX 414 and 415 logic signals ADDRWD+0B and ADDRWD+0A are low which set the read address of RAF 206 to location 00 and PRA appears on address signal lines AORO 05-22, FIG. 2, and is strobed into LR 204 when logic signal CYFIFO goes high. BSAD 23+ is low the $\overline{Q}$ output which inputs NAND 411 goes high. When logic signal MYACKD, the input of NAND 411 goes high, the output of NAND 411 goes low setting flop 413 with the Q output logic signal FCHZRO+ high.

On the next bus 5 cycle the data word PRA+2 location in main memory 3 is transferred to cache 1 and the Function Code on bus 5 signal lines BSAD 18-23 is still 00 and BSAD 23+ the low order bit is low. In this case, in FIG. 4, FIFO bit position 18 of FIFO 203 is set low and FIFO bit position 42 is high, since flop 413 is set with the Q output logic signal FCHRZO+ high. The outputs of 4:1 MUX 414 and 415, logic signal ADDRWD+0B is low and logic signal ADDRWD+0A is high since the 2 input terminal of 4:1 MUX 414 is at logical ZERO and the 2 input terminal of 4:1 MUX 415 is a at logical ONE thereby, reading out location 02 of RAF 206 which has the PRA+2 address stored.

The third data word transfer cycle over bus 5 brings the data word from the PRA+1 main memory 3 location with a Function Code of $01_8$. In this case, BSAD 23+ is high and FIFO bit position 18 of FIFO 203, FIG. 4, is high setting the 3 input terminal of 4:1 MUX 414 and 415 active. FIFO bit position 43 is low and FIFO bit position 42 is a "don't care". In this case with FIFO 18 high the ADDRWD+0B output of flop 414 is high and the ADDRWD+0A output of flop 415 is low reading out from RAF 206 location 01 which contains PRA+1. BSAD 23 high causes flop 409 to set when logic signal BSDCND+ goes high, setting the Q output logic signal BSAD23+10 high forcing the output of NAND 410 low when logic signal MYACKD+ goes high. This sets flop 412 and its Q output logic signal FCHONE+ goes high. The 4th bus 5 cycle bringing the data word from the PRA+3 location in main memory 3 has a Function Code of 01. BSAD 23 high as before sets FIFO bit position 18 high and FIFO bit position 43 is set high since logic signal FCHONE+ is high.

The output of 4:1 MUX 414 and 415 logic signals ADDRWD+0B are high and ADDRWD+0A is high reading out RAF 206 location 03 which stores PRA+3. Flops 412 and 413 are reset when logic signal MEMREQ+ goes low.

For a blanked memory, two data words are transferred from main memory 3 to cache 1 over bus 5 on two separate bus 5 cycles. In this case, switch 407 is set to terminal 2 (banked), setting the input of inverter 408 high, forcing the output logic signal ADDRWD+ low. Also, for the banked memory, the function code is $00_8$ as the response to the memory request. Therefore, BSAD23+ is low for both data words sent to cache 1 from main memory 3 over bus 5. FIFO bit position 18 of FIFO 203 is therefore low for both data words. The select inputs of 4:1 MUX 414 and 415 of terminals 1 and 2 are both low thereby activating input terminal 0. When the first data word is read into FIFO 203 from bus 5, logic signals ADDRWD+0B and ADDRWD+0A are both low and PRA stored in location 00 is read out of RAF 206. Then, when logic signal MYACKD is forced high, the output of NAND 411 goes low, setting flop 413. BSAD23-10 $\overline{Q}$ the output of flop 409 is high at this time. The Q output FCHZRO+ flop 413 high is stored in FIFO bit position 42 on the next FWRITE enable pulse of FIFO 203. This forces the output of 4:1 MUX 414 ADDRWD+0B high, so that the address in RAF 206 location 01 (PRA+1) is transferred to LR 204 with the second data word in response to the memory request.

Flops 412, 413, 426 and 427 are 74S112 logic circuits described on page 5-34 and flop 409 is a 74S175 logic circuit described on page 5-46 of the aforementioned TTL Data Book.

In the initialization mode, the CLEAR— logic signal initializes the contents of AOR 207 to all zeros. This forces the adder 211 output to all zeros. Therefore, when the strobe signals BAOROCK and BAWRIT are forced low the adder 211 output of all zeros is written into AOR 207 and RAF 206 location 00.

In the QLT mode the RAF write strobe BAWRIT and the AOR write strobe BAORCK are forced low when the 2 inputs to NAND 443 are forced low when the 2 inputs to NAND 443, logic signal CYQLTO—1A and CYQLTO+0B are high. This forces the output of NAND 443 low, forcing the output of NOR 419, logic signal AORCNT high. As previously discussed, write strobes BAWRIT and BAORCK are forced low. This sets PRA address location 0000 into AOR 207 and location 00 of RAF 206. The RAF Write Address Counter 234 is advanced to location 01 when logic signal AORCNT—30, the output of inverter 423 is forced low. Logic signals ADDRR1+, the Q output of flop 427 and ADDRR0—, the Q output of flop 426 are set high. This forces the +1 terminal of ADDER 211, the output of EXCLUSIVE OR 237 high and signal lines AORO 05—22+, the outputs of ADDER 211 are forced to hexadecimal $00001_{16}$.

When logic signal BLOCKF+, the input to NAND 417, is forced high the 3 inputs to NAND 417, FIG. 4, are high and the output is forced low forcing logic signal AORCNT, the output of NOR 419. This forces write strobes BAWRIT and BAORCK low setting address location 0001 into RAF 206 location 01 and AOR 207. The write address counter 234 then advances to location 02. The Q output of flop 426, logic signal ADDRR0+ is set high and logic signal ADDRR1+, the Q output of flop 427 is set low, in FIG. 2, the output of EXCLUSIVE OR 237 logic signal +1 again goes high forcing the output of ADDER 211, signal lines AORO 05—22+ to 0002.

When MYACKR+ the input to NAND 418, FIG. 4, goes high, the output is forced low, forcing logic signal AORCNT, the output of NOR 419 high. In this case, write strobe address BAORCK remains high since the input to NAND 424, logic signal ADDRRO— is low. Write strobe BAWRIT is forced low setting $000,002_8$ into location 02 of RAf 206. Write address counter 234 is advanced to location 03. Logic signal MYACKR+ again goes high and address location 0002 is stored in location 03 of RAF 206 and the write address counter is advanced to location 00.

Locations 02 and 03 of RAF 206 are considered "dummy" locations and are not used in the QLT mode.

When the inputs to NANd 441, logic signals MEMREQ—, CYQLTO+ and CYFIFO are high the output is low forcing the output of NOR 442 low forcing logic signal AORCNT, the output of NOR 419 high. This sets address location 0002 into AOR 207 and RAF 206 location 00 and advances the write address counter 234 to location 01.

The above sequence continues until address location 4096 is set into AOR 207 and RAF 206 and the QLT operation is concluded.

Logic signal ADDRWD+, the output of NOR 408 remains high for the QLT mode since the input, logic signal CYQLTO— remains low. This forces terminals 2 of 4:1 MUX 414 and 415 high, since FIFO bit position 18 of FIFO 203, FIG. 4, remains low. Select terminals 1 of 4:1 MUX 414 and 415 are forced low. Therefore, input terminal 2 of 4:1 MUX 414 and 415 are active since select terminal 1 is low and select terminal 2 is high.

DETAILED DESCRIPTION OF CYCLE CONTROL 232—FIG. 5, Sheets 1 & 2

Logic signals MYACKD, BSDBPL—, BSWAIT, MYDCNN+, MEMREQ+, BSDCND—, BSACKR, CLEAR— and CLRREQ—0A connect to system bus control 219. MEMREQ— connects to AOR and RAF control 235 and address control unit 13. Logic signals CYFIFO, CYREAD+ and FEMPTY+30 connect to FIFO R/W control 230. Logic signal NO HIT + connects to directory 202. Logic signal MYACKD connects to an input of NAND 506 and BSDBPL— connects to the other input of NAND 506 whose output connects to an input of NOR 507 whose output, logic signal DATACK— connects to the CLOCK inputs of flops 508 and 509. Logic signal BSWAIT connects to an input of NAND 505 and MYDCNN+ connects to the other input of NAND 505 and a SET input to flop 504. Logic signal BLOCKF+ connects between the Q output of flop 504 and the other input to NAND 505 whose output connects to the other input of NOR 507. Logic signal BSACKR connects to the CLOCK input of flop 504 whose $\overline{Q}$ output logic signal BLOCKF— connects to an input to NOR 536. Logic signals CYQLTO—, NOHIT+, CYREAD+, and FEMPTY+30 connect to the inputs of NOR 501 whose output connects to an input of NOR 502 whose output connects to the D input of flop 503. Logic signal CYQLT0+0D connect between a NOR 565 output and the PRESET input of flop 503. The $\overline{Q}$ output of flop 503, logic signal MEMREQ—, connects to an input of NOR 502 and logic signal MEMREQ+0C connects to the other input of NOR 502. The CLOCK0+ signal connects to the CLK input of flop 503 whose Q output logic signal MEMREQ+ connects to the RESET inputs of flops 508, 509 and 504. Logic "1" connects to the SET input of flop 508 whose Q output, logic signal DATCTO, connects to the SET input of flop 509 whose Q output, logic signal DATCTI, connects to an input of NAND 510 whose output, logic signal MEMREQ RESET, connects to the input of a NOR 566 whose output connects to the RESET input of flop 503. Logic signal CLEAR— connects between system bus control 219 and the other input of NOR 566.

Logic signals ADDRWD+0A and ADDRW+0B connect to the inputs of their respective inverters 523 and 524 whose outputs, logic signals ADDRWD—0A and ADDRWD—0B connect to the inputs of AND 533 whose output connects to an input of NOR 527. FIFO41+ connects to another input of NOR 527. Logic signal FEMPTY+30 connects to inputs of NOR 526 and Inverter 534 whose output logic signal FEMPTY—30 connects to another input of NOR 527. Logic signal CYREAD connects to inputs of NOR 526 and 527. Logic signal NOHIT+ connects to an inverter 525 input whose output logic signal CAHIT connects to an input of NOR 526. The outputs of NOR 526 and 527 connect to their respective inputs of NOR 528 whose output connects to the D input of flop 529. The Q output of flop 529 logic signal CYCADN+, connects to inputs of inverters 520 and 532. The output of Inverter 530 connects to the input of Delay line 531 whose output connects to the RESET terminal of flop 529. The output of Inverter 532, logic signal CYCADN— connects to cache CPU interface unit 6. CLOCK0+ connects to the CLK input of flop 529. Logic signal BANKED+ connects between AOR and RAF control 235 and an input of a NAND 560 whose output connects to the input of NOR 536 and the PRESET input of flop 508. Logic signal CYQLTO— connects to the other input of NAND 560. CYFIFO connects to the other input of NAND 510. Logic signals CYQLTO+ and CLEAR— connect to inputs of a NAND 561 whose output connects to inputs of delay lines 562 and 563 and an inverter 567. The output of delay line 562 logic signal CYQLTO+0B connects to the input of an inverter 564 and to AOR and RAF control 235. The output of inverter 564, logic signal CYQLTO−1B connects to an input of a NOR 565 whose output logic signal CYQLTO+0D connects to the PRESET input of flop 503. The output of delay line 563, logic signal CYQLTO+0C connects to the other input of NOR 565. The output of inverter 567, logic signal CYQLTO−1A connects to AOR and RAF control 235.

Logic signals REPLACE and FIFO 17+ connect between inputs of an AND 567 and LR 204. Logic signal CYWRIT connects between FIFO RW control 230 and the 3rd input of AND 567 whose output, logic signal, MEMREQ+0D connects between the input of a NOR 569 and a NAND 570. The outputs of NOR 569 logic signal MEMREQ+0C connects to an input of a NOR 502. Logic signal BAOR 10+10 connects between AOR 207, the input of an inverter 568 and the other input to NAND 570. The output of inverter 568, logic signal QLTDUN— connects to another input of NOR 569. The output of NAND 570 connects to the RESET input of a flop 571. Logic signal 1 connects to the PRESET and D inputs and logic signal CLEAR— connects between system bus control 219 and the CLK input of flop 571. The Q output logic signal CYQLTO+ connects to the 3rd input of NOR 569 and the Q output, logic signal CYQLTO— connects to an input of AND 533. Logic signal CLRREQ+0B connects between the output of NOR 536 and an input of NAND 535. Logic signals MYDCNN+ and BSDCND— connect to the other inputs of NAND 535.

During the normal CPU2 request mode the first memory request cycle flop 503 sets on the rise of CLOCK0+ if the CPU2 requested address PRA is not stored in the directory 202. The output of NAND 231, FIG. 2, logic signal NO HIT+ is high forcing the output of NOR 501, FIG. 5 low, forcing the output of NOR 502 high setting flop 503. The Q output logic signal MEMREQ+ going high sets the cycle request flop 511 of system bus control 219 to request a bus 5 cycle. The acknowledge response from main memory 3, logic signal BSACKR going high sets flop 504 whose Q output BLOCKF+ inputs the AOR and RAF control 235; this operation is described supra.

If there is a "hit" during the first memory request cycle, the logic signal NO HIT+ input to inverter 525 is low, setting the logic signal CAHIT input to NOR 526 high setting the input to NOR 528 low, setting the D input to flop 529 high. FEMPTY+30 is high at this time since FIFO 203 is empty. On the rise of timing signal CLOCK0+ flop 529 sets and the Q output logic signal CYCADN+ goes high forcing the output of inverter logic signal CYCADN— low which signals CPU2 that the requested data is available. Logic signal CYCADN+ is inverted by inverter 530, delayed 25 ns. by delay line 531 and resets flop 529. If there was not a "hit" in the first memory request cycle then during the cycle that sends the PRA data word from main memory 3 to cache 1 over bus 5, CYCADN+ is again set high as follows. The Read Address Multiplexer 233, FIG. 2, output logic signals ADDRWD+0B and ADDRWD−+0A are low and are forced high by inverters 523 and 524 which set the output of AND 533 high, setting the output of NOR 527 low, setting the output of NOR 528 high, setting flop 529 as before. At this time FIFO 203 is not empty, and CYREAD is high since logic signal CYFIFO, FIG. 3, has not cycled high.

Flops 508 and 509 are configured as a counter. For an interleaved memory, logic signal MYACKD goes high during each bus 5 cycle where the data word is sent from main memory 3 to cache 1 over bus 5 in response to a CPU2 request. Logic signal BSDBPL—goes low for the 2nd word of the 2 word response or if only one word is sent from main memory 3 to cache 1 over bus 5. Only one word may be sent to cache 1 if main memory 3 was busy to the 2nd word request from cache 1. This sets the output of NAND 506 low, forcing the output of OR 507 logic signal DATACK— low setting flop 508 in response to the 2nd word received from main memory 3. DATACK— goes low for the 4th word since MYACKD and BSDBPL— are again high setting flop 509 since the SET input logic signal DATCTO is high. The Q output of flop 509, logic signal DATCTI, going high sets the output of NAND 510, logic signal MEMREQ RESET low, resetting flop 503 through NOR 566. CLEAR— the other input to NOR 566 going low also resets flop 503. Flop 503 was held set through the logic signal MEMREQ— input to NOR 502 set low. This kept the SET input of flop 503 high at every rise of CLOCKO+. If the main memory 3 response to the 2nd memory request was logic signal BSWAIT high then the output of NAND 505 goes low forcing DATACK—, the output of OR 507 low thereby setting flop 508. Since the 2nd memory request is aborted if the main memory 3 response is BSWAIT, the Data Counter flop 508 must be set since only 2 data words will be received from main memory 3. For the banked memory, the input to inverter 537, logic signal BANKED+00, is high setting the output low which sets the PRESET input of flop 508 low setting the Q output, logic signal DATCTO, high. Since the banked memory system only makes one memory request and cache 1 received 2 data words in response, the 2nd data word in response will set flop 509 as above and reset flop 503. Logic signal MEMREQ+ going low resets flops 504, 508 and 509.

During a system initialization cycle, logic signal CLEAR— is transferred over bus 5 to receiver 217, FIG. 2, as a negative going pulse which sets flop 571, FIG. 5, on the rise of the trailing edge. This sets logic signal CYQLT0+ high and logic signal CYQLT0− low.

The output of NOR 561 is normally high. When logic signals CLEAR— and CYQLTO+, the inputs to NOR 561 are high, the output is forced low. 160 ns. later, the output of delay line 562, logic signal CYQLTO+0B is forced low which forces the output of inverter 564, logic signal CYQLTO−1B high. This signal inputs NOR 565. The other input to NOR 565, logic signal CYQLTO+0C, the output of delay line 563 is high at this time and remains high for 40 ns. This forces the output, logic signal CYQLTO+0D low for 40 ns. setting flop 503 and the Q output MEMREQ+ goes high starting a main memory 3 request cycle as before.

When logic signal MEMREQ+ is high, 2 bus 5 cycle requests are made by cache 1. The first request sends the even address to main memory 3 and the second request sends the odd address to main memory 3. The first data word sent to cache 1 from the even address location of main memory 3 to cache 1 sets the data counter, flop 508, FIG. 5. The second data word to cache 1 cycle from the odd address location of main memory 3 sets the data counter flop 509 whose Q output logic signal DATCTI forces the output of NAND 510 low when CYFIFO is high thereby resetting the memory request flop 503 which in turn resets the data counter flops 508 and 509.

During the second data cycle, the input to AND 567, logic signal FIFO 17+, the low order address bit stored in LR 204, is high. The other inputs, logic signals CYWRIT and REPLACE going high force the output high. This forces the output of NOR 569, logic signal MEMREQ+0C low, forcing the output of NOR 502 high. On the next rise of CLOCK0+ flip 503 sets and the Q output, MEMREQ+, again goes high starting the next bus 5 cycle request.

The logic signal CYQLTO− input to NOR 501 low during the QLT mode, simulates a directory 202 "no hit" condition.

When the 4096$^{th}$ word is requested from main memory 3 address location 7777$_8$, AOR 207, FIG. 2, is incremented +1 by ADDER 211. The next address 10000$_8$ is set into AOR 207 as described supra. The output line BAOR 10+ is high and inputs NAND 570, FIG. 5. During the cycle when the 4096$^{th}$ data word is transferred from main memory 3 to cache 1 over bus 5 the inputs to AND 567, CYWRIT, REPLACE and FIFO17+ are high forcing the output, logic signal MEMREQ+0D high. This forces the output of NAND 570 low resetting flop 571 and the Q output, logic signal CYQLT0+ goes low. The logic signal QLTDUN− high input to NOR 569 prevents flop 503 from setting after the 4096$^{th}$ data word is received. Logic signal CYQLT0−, the input to AND 533 low, prevents flop 529 from setting during the QLT operation.

DETAILED DESCRIPTION OF SYSTEM BUS CONTROL 219—FIG. 5, Sheets 3 & 4

Logic signals BSAD 08-15−, 16+ and 17− connect between the receiver 213 output and an AND 546 whose output logic signal MYCHAN, connects to the SET input of flop 516. BSMREF+ connects between receiver 217 and inverter 547 whose output BSMREF− connects to the AND 546 input. Logic signal BSDCNN+ connects between the receiver 217 cycle control 232, a delay line 522 input, and one input of an OR 521. The output of delay line 522 connects to the other input of OR 521 whose output logic signal BSDCNB+ connects to AOR and RAF control 235 and to the RESET terminal of flops 514, 516, 536, 574 and AOR and RAF control 235. The output of delay line 522, logic signal BSDCND+, also connects to the CLK terminals of flops 516 and 536 and 574. Logic signal MYACKR connects between the Q output of flop 516 and the input terminals of delay lines 517, 518, AOR and RAF control 235, FIFO R/W control 230 and driver 218. The output of delay line 517 connects to an input of AND 520 whose output logic signal MYACKD connects to AOR and RAF 235 and to an input of NAND 506 in cycle control 232. The output of delay line 518 connects to an inverter 519 input whose output connects to the other input of AND 520. Logic "1" signal connects to the SET input of flop 536 whose Q output, logic signal BSDCND−, connects to an input of NAND 535 in cycle control 232. Logic "1" signal connects to the PRESET and D inputs of flop 511. The Q output of flop 511 logic signal CYREQ+ connects to an input of NAND 513. Logic signal BSBUSY− connects between an output of NOR 540 and the other input of NAND 513 whose output logic signal SETREQ− connects to a PRESET input of flop 515. Logic "1" signal connects to a PRESET input of flop 514. Logic signal BSDCND+ connects to the D input and the RESET input. MYDCNN− connects between the CLK input of flop 514 and a $\overline{Q}$ output of flop 541. The Q output of flop 514 logic signal MYREQR+ connects to the CLK input of flop 515. The CLEAR− logic signal connects to the RESET input of flop 515. Logic signal BSWAIT connects to an input of AND 512 whose output logic signal MYREQ+ connects to the D input of flop 515 whose Q output logic signal MYREQT connects to driver 218 and an input to AND 542. Logic signals BLOCKF+ and CYQLT0− connect between Cycle Control 232 and inputs to a NOR 572 whose output connects the other input of AND 512. BSDCNB+ connects to an inverter 544 input whose output connects to the input of AND 542 whose output, logic signal SETDCN− connects to the PRESET input of flop 541. Logic signals BSACKR and BSWAIT connect between inputs of NOR 543 and Receiver 217. The NOR 543 output connects to the RESET input of flop 541. CLEAR connects between an inverter 573 output and to the input of NOR 543. CLEAR− connects between an input of inverter 573 and receiver 217. BSDCNB− connects between the output of inverter 544 and an input of AND 538. BSREQT+ connects between the input of AND 538 and Receiver 217 and CLEAR− connects to the input of AND 538 whose output connects to the inputs of delay line 539 and an input of NOR 540. The output of delay line 539 connects to the other input of NOR 540. The Q output of flop 541, logic signal MYDCNN+ connects to the enabling gates of Drivers 212, 214 and 218 and the input of NAND 535 in cycle control 232. The output of flop 536 logic signal BSDCNB− connects to the input of NAND 535 of cycle control 232. Priority logic signals BSAUOK—BSIUOK connect between AND 542 inputs and receiver 217.

Logic signals MEMREQ+ and CLRREQ−0A connect between cycle control 232 and the CLK and RESET inputs respectively of flop 511. Logic signal BSDBPL+ connects between the SET input of flop 574 and receiver 217. The $\overline{Q}$ output of flop 574, logic signal BSDBPL− connects to cycle control 232.

During the first memory request cycle, if the CPU2 requested data is not in cache 1 then the MEMREQ+ CLK input to flop 511 goes high setting the Q output, logic signal CYREQ+, the input to NAND 513 high. The logic signal BSBUSY− is high if the bus 5 is not busy and the output of NAND 513, logic signal SETREQ− goes low setting flop 515 whose Q output MYREQT goes high and inputs AND 542 requesting a bus 5 cycle. If bus 5 does not have a high priority request the logic signals BSAUOK through BSIUOK are high, and if bus 5 is not transferring information then logic signal BCDCNB− is high and the logic signal SETDCN− output of AND 542 goes low setting flop 541 and the Q output MYDCNN+ goes high gating drivers 212, 214 and 218 putting out on bus 5 information in a format 8b of FIG. 8. When main memory 3 receives the bus 5 information, the acknowledge logic signal BSACKR is sent back to cache 1 over bus 5 and reset flop 541 by setting the NOR 543 output low. The Q output, logic signal MYDCNN−, going high sets flop 514 whose Q output logic signal MYREQR+ high, resets flop 515 since the D input logic signal MYREQ is low. This sets the Q output logic signal MYREQT low. A BSWAIT signal returned by main memory 3 indicating that main memory 3 is busy, resets flops 541 since the output of NAND 543 goes low. However, since the output of AND 512 is high when flop 514 sets and its Q output logic signal MYREQR+ goes high, the Q output of flop 515, logic signal MYREQT remains high and the first memory request is repeated.

In the interleaved mode when main memory 3 acknowledges the first memory request by sending the BSACKR logic signal, flop 511 remains set with the Q output logic signal CYREQ+ high to start the second memory request cycle. Flop 511 remains set during the interleaved mode since the output of NAND 535 remains high as does the CLK input MEMREQ+. The CLRREQ+0B input to NAND 535 is low as long as BLOCKF− input to NOR 536 is high. Logic signal BLOCKF− goes low after the first BSACKR acknowledge. When MYDCNN+ goes high during the second memory request cycle flop 511 is reset since BLOCKF− is low.

However, if the system is in the banked mode flop 511 is reset since the output of NAND 535 in cycle control 232 goes low at the end of the first memory request cycle. Logic signal CLRREQ+0B, the input to NAND 535 is high forcing the output of NAND 535, logic signal CLRREQ−0A low when MYDCNN+ goes high. A second memory request cycle starts when logic signal BSREQT the input to AND 538 goes low when there is no request being made of bus 5 and the output of AND 538 goes low forcing the NOR 540 input low. 20 ns. later the other input to NOR 540 goes low forcing the output logic signal BSBUSY− high. Note that CLEAR is normally high and goes low during system initialization to reset functions. With both inputs to NAND 513 high, the output, logic signal SETREQ− going low again sets the Q output of flop 515 logic signal MYREQT high which requests a bus 5 cycle. Again the output of NAND 542 logic signal SETDCN− goes low setting flop 541 whose Q output logic signal MYDCNN+ goes high gating drivers 212, 214 and 218 to send out the second memory request in a format 8b of FIG. 8 over bus 5 to main memory 3. If main memory 3 sends back the acknowledge logic signal BSACKR flop 541 is reset as before which sets flop 514 which resets flop 515 setting the Q output logic signal MYREQT low. Logic signal MYDCNN+ the input to NAND 535 going high sets the RESET input to flop 511 low setting the Q output logic signal CYREQ+ low thereby preventing subsequent memory request bus 5 cycles. Logic signal CLEAR the input to NOR 543 also resets flop 541.

If main memory 3 were busy and sent back a BSWAIT logic signal in response to the second memory response, flop 541 resets since logic signal BSWAIT going high forces the NOR 543 output low, and the Q output of flop 541, logic signal MYDCNN− goes high setting flop 514 whose Q output logic signal MYREQR goes high. The D input to flop 515 is low since logic signal BLOCKF+ is high at this time forcing the output of NOR 572 low. This forces the output of AND 512, logic signal MYREQ+ low. When logic signal MYREQR+ goes high flop 515 resets setting the Q output logic signal MYREQT low. Since flop 511 was reset during the second memory request cycle as before the second memory request is aborted. However, in the QLT mode logic signal CYQLT0−, the input to NOR 572 is low forcing the output high. When the BSWAIT response is given the output of AND 512 is high setting flop 515. The Q output logic signal MYREQT high starts another memory request.

The flops 503, 504, 511, 514, 515, 529, 541 and 571 are 74S74 circuits described on page 5-22 of the aforementioned TTL Data Book. Flops 508 and 509 are 74S112 logic circuits described on page 5-34 and flops 516, 536 and 574 are 74S175 logic circuits described on page 5-46 of the aforementioned TTL Data Book.

Main memory 3 sends the logic signals BSDCNN+ and the information in a format 8c of FIG. 8 out on bus 5 to receivers 213, 215 and 217 and the information is strobed into FIFO 203. BSAD 08-17 input AND 546 along with logic signal BSMREF− which was inverted by inverter 547. If the cache 1 identification is $0002_8$, that is BSAD16+ is high and BSAD 00-15 and 17− are high and that is not a main memory 3 write, i.e., BSMREF− is high, then the output of AND 546 logic signal MYCHAN goes high. Logic signal BSDCNN+ high sets the output of OR 521, logic signal BSDCNB+, high which sets the RESET input of flop 516 high. Logic signal BSDCNN+ is delayed 60 ns. by delay lines 522 and sets flop 516 whose output logic signal MYACKR going high advances the FIFO Write Address Counter flops 320 and 321, FIG. 3. This operation was described supra. Logic signal MYACKR high sets flops 305, FIG. 3, and the Q output logic signal INTERG+ going high gates the data through buffer bypass drivers 205, FIG. 2, to junction 216 since this first data word from main memory 3 is in response to the CPU2 request. Logic signal MYACKR also goes out on bus 5 to acknowledge to main memory 3 that cache 1 received the information sent out by main memory 3 addressed to cache 1. In FIG. 5, logic signal MYACKR is delayed 20 ns. by delay line 517 and inputs AND 520 whose output, logic signal MYACKD goes high 20 ns. after the rise of MYACKR. Logic signal MYACKR is delayed 40 ns. by delay line 518, is inverted by inverter 519 and sets the other input of AND 520 low. Logic signal MYACKD is a positive going 20 ns. pulse delayed 20 ns. from the rise of MYACKR. Logic signal MYACKD delays the setting of the Function Code History flops 412 and 413, FIG. 4, until after the data received from bus 5 is set into FIFO 203.

The above sequence is repeated in the interleaved mode for the 4 cycles in which the data words are transferred from main memory 3 to cache 1 in response to the first and second memory requests. In the banked mode the sequence is repeated for 2 cycles in response to the one memory request.

SYSTEM BUS 5 FORMATS

FIG. 8 shows the system bus 5 formats processed by cache 1 and/or main memory 3. 8a of FIG. 8 shows the memory address field with an 18 bit main memory 3 word address BSAD 05-22 of a 20 bit data word BSDT 00-15, A, B, DSDP 00, 08. This format is used by CPU2 to update main memory 3 over system bus 5. Cache 1 reads the address and data in FIFO 203 from bus 5 through receivers 213, 215 and 217. Cache 1 senses that logic signal BSMREF is high, indicating that the address field contains a main memory 3 address, senses that BSWRIT is high indicating this is a write operation, and checks if the address location is written into cache 1. If the address is found in directory 202, FIG. 2, then the data word stored in data store 201 is updated. If the address is not in the directory 202, then the data is discarded. A peripheral controller may send a 19 bit byte main memory 3 address BSAD 05-23. In that case, cache 1 would update byte 0 or byte 1 if either byte is stored in the data buffer 201.

8b of FIG. 8 shows the main memory 3 request sent from cache 1 to main memory 3. The address field contains the main memory 3 word address BSAD 05-22. The data field contains the 12 bit cache 1 identification code $0002_8$, BSDT A, B, 00-09 and the 6 bit function code $00_8$ or $01_8$. A function code of $00_8$ designates the bus cycle as the first memory request cycle. The function code of $01_8$ designates the bus 5 cycle as the second memory request cycle. BSMREF is high since this is a request of main meory 3.

8c of FIG. 8 shows the main memory 3 response format to the memory read request of 8b of FIG. 8. The address field contains the destination number of cache 1, $0002_8$ and the function code $00_8$, indicating a response to a first memory request or the function code $01_8$ indicating a response to a second memory request, BSWAIT+ indicates that main memory 3 is requesting cache 1 to write the data word in cache 1 at the address indicated by the 8b of FIG. 8 main memory 3 read request. BSSHBC high indicates that this is in response to a memory request. An interleaved memory main memory 3 request in a format 8b of FIG. 8 contains PRA for the first request address and PRA+1 for the 2nd request address. Main memory 3 responds with the PRA and PRA+2 data words in response to the first request and the PRA+1 and PRA+3 data words in response to the 2nd request.

A banked memory main memory 3 request in a format 8b of FIG. 8 contains PRA. Main memory 3 responds with the PRA and PRA+1 data words.

ROUND ROBIN 224—FIG. 6

Logic signal CYWRIT connects between FIFO R/W Control 230, the inputs to delay lines 603 and 605 and the CLK inputs of flops 610 and 611. The output of delay line 603 connects to the input of an AND 604. The output of delay line 605 connects to an input of an inverter 614 whose output connects to the other input of AND 604. The output of AND 604 connects to inputs of an inverter 606 and a NAND 607. The output of inverter 606, logic signal WRTPLS— connects to the ENABLE terminal of 2:1 MUX 223. Logic signal REPLACE connects between LR 204, the other input of NAND 607 and the SELECT terminal of 2:1 MUX 223. The outputs of AND 613a-d, logic signals LEVEL0-3+ connect to the "1" input terminals of 2:1 MUX 223. The output of NAND 607, logic signal RNDWRT— connects to the Write Enable terminals of Random Access Memory RAM 601 and 602; the Read Enable terminals are connected to ground.

Signal lines ADDR 08-17+ connect between 2:1 MUX 208 and the ADDRESS select terminals of RAM 601 and 602. Logic signal RNDADD+ connects between NOR/AND 612 and the data input of RAM 601 whose data output ROUND0+0A connects to the D input of a flop 610. Logic signals BAOR 11+10 and BAOR 12+10 connect between AOR 207 and inputs to a NOR 608 whose output logic signal ROUNDR— connects to the D input of a flop 609. Logic signal CYFIFO connects between FIFO R/W control 230 and the CLK input of flop 609. The $\overline{Q}$ output of logic signal ROUND0-0R connects to the CLR inputs of flops 610 and 611. Logic signal CYQLT0+ connects between cycle control 232 and the CLR input of flop 609.

The Q output of flop 610, logic signal ROUND0+ connects to inputs of NOR/AND 612, AND 613c and AND 613d. The $\overline{Q}$ output, logic signal ROUND0— connects to the inputs of NOR2/AND 612, AND 613a and AND 613b. The $\overline{Q}$ output of flop 611, logic signal ROUND1+, connects to inputs of NOR1/AND 612, AND 613b and AND 613d. The Q output, logic signal ROUND1—, connects to inputs of NOR2/AND 612, AND 613a, AND 613c and the data input of RAM 602. The data output of RAM 602 logic signal ROUND1-+0A connects to the D input of flop 611.

Signal lines HIT0-3+ connect between the COMPARE 221a-d outputs and the 0 terminal of 2:1 MUX 223. Signal lines WRITE0-3 connect between the 2 terminal of 2:1 MUX 223 and data buffer 201 and directory 202.

Round robin 224 selects the next level of data buffer 201 and directory 202, FIG. 2, into which new information is written. Round robin 224 points to the oldest information for that column address ADDR 08-17. That is the information for replacement.

The two 1 bit by 1024 RAM 601 and 602 are set to level 0 for each column address; that is, the 1024 addresses in RAM 601 and the 1024 addresses in RAM 602 are set to 0 during the QLT mode.

Initially, logic signal CYQLT0+, the CLR input to flop 609 is high. Both inputs to NOR 608, logic signals BAOR 11+10 and BAOR 12+10 are low forcing the output logic signal ROUNDR— high. When logic signal CYFIFO goes high flop 609 sets and the $\overline{Q}$ output, logic signal ROUND0-0R goes low preventing flop 610 and 611 from setting. Logic signals ROUND0— and ROUND1— are high forcing the output of AND 613a, signal LEVEL0+ high.

The 2 inputs to NOR2/AND 612, logic signals ROUND0— and ROUND1— are high forcing the output logic signal RNDADD+ low. The data input to RAM 601 therefore is low. Since the $\overline{Q}$ output of flop 611, logic signal ROUND1— is high, the data input to RAM 602 is high.

During the QLT mode, the first 4096 data words in main memory 3 are written into the data buffer 201 and their respective row addresses ADDR 00-07-10 are written into directory 202. The first 1024 data words with their row addresses are written into level 0, the second 1024 data words with their row addresses are written into level 1, the third 1024 data words with their row addresses are written into level 2 and the last 1024 data words with their row addresses are written into level 3. The levels are selected by the round robin RAM 601 and 602.

For each of the first 1024 write cycles, logic signal CYWRIT the input to delay lines 603 and 605 goes high. 20 ns. later the output of delay lines 603 goes high. Both inputs to AND 604 are high and the output logic signal WRITPLS+ is high. REPLACE is high in the QLT mode. This forces the output of NAND 607, logic signal RNDWRT— low enabling the write function of RAM 601 and 602. The output of inverter 606, logic signal WRTPLS— goes low enabling 2:1 MUX 223. 50 ns. later the output of delay line 605 goes high forcing the output of inverter 614 low. This forces the output of AND 604 low forcing the output of inverter 606, logic signal WRTPLS— high. Logic signal RNDWRT—, the output of NAND 607 goes high terminating the write enable pulse.

All zeros are forced into the 1024 successive addresses of RAM 601 and all ones are forced into the 1024 successive addresses (0–1023) of RAM 602.

When address 1024 ($2000_8$) is stored in AOR 207, BAOR 12+10 is high forcing the output of NOR 608, logic signal ROUNDR— low. When logic signal CYFIFO goes high, flop 609 resets and the $\overline{Q}$ output logic signal ROUND0-0R goes high. Flops 610 and 611 are now activated. ADDR 08-18+ selects address $0000_8$ of RAM 601 and 602. The data output, logic signal ROUND0+0A is low and logic signal ROUND1+0A is high. When logic signal CYWRIT goes high flop 611 sets and the Q output logic signal ROUND1+ is high. Logic signals ROUND1+ high and ROUND0— high select the output of AND 613b, logic signal LEVEL 1+. Also, the output of NOR-/AND 612 is forced high writing a "1" in RAM 601 and a "0" in RAM 602 at address $000_8$.

This sequence continues until 1024 level 1 locations in data buffer 201 and directory 202 are filled and RAM 601 stores a "1's" and RAM 602 stores all "0's".

Logic signal BAOR 11+10 is high for the transfer of data words in addresses 2048 to 4096 keeping flop 609 reset. Flop 610 is set and flop 611 is reset for the 3rd 1024 data words with their row addresses to be written into data buffer 201 and directory 202. In this case, the output of AND 613c, logic signal LEVEL 2+ is high. During this 3rd sequence "1's" are written into all addresses of RAM 601 and 602.

During the 4th sequence flops 610 and 611 are set selecting the output of AND 613d, logic signal LEVEL 3+ high. This results in all 0's being written into RAM 601 and 602. During the sequence when the 4096th data word is transferred from main memory 3 and written into cache 1, logic signal CYQLTO+ goes low resetting flop 609 thereby enabling flips 610 and 611 for subsequent replacement operation.

Flop 609 is a 74S74 logic circuit described on page 5-22. Flops 610 and 611 are 74S175 logic circuits described on page 5-46 and NOR/AND 612 is a 74LS51 logic circuit described on page 5-16. The above are described in the aforementioned TTL Data Book.

DESCRIPTION OF OPERATION

FIG. 9 is a flow diagram illustrating the Quality logic test (QLT) mode. As a result of system initialization, a negative going CLEAR— signal is sent over bus 6 to cache 1. As a consequence of receiving the CLEAR— signal, the contents of the first 4096 address locations in main memory 3 are stored in the 4 levels of data buffer 201, FIG. 2. The directory 202 is loaded with the respective row addresses of the first 4096 address locations and the round robins RAMs are set to point to Level 0 as the first level in data buffer 201 and directory 202 to be replaced.

FIG. 7 is a timing diagram of the QLT operation and will be used with FIG. 9 in the description of the overall operation.

START 901 designates a bus 5 transfer cycle. Cache 1 receives all bus 5 transfers for possible updating or replacement. These operations are described in copending related applications Ser. Nos. 863,091 and 863,092.

In the QLT operation logic signal CLEAR— is received by cache 1 over bus 5. This is indicated by START 900.

The decision block 901 selects the QLT mode 902 and in block 903, flop 571, FIG. 5, sets on the rise of logic signal CLEAR— and the Q output logic signal CYQLTO+ goes high. This forces the output of NOR 561 low and logic signal CYQLTO-1A, the output of inverter 567 is forced high. Logic signal CYQLTO+OB, the output of delay line 562 remains high for 160 ns. In FIG. 4 the output of NAND 443 goes low forcing the output of NOR 419, logic signal AORCNT, high.

In block 904 the output of ADDER 211, FIG. 2, signal lines AORO 05-22+ are at $000000_8$. The output of NAND 241 is high switching 2:1 MUX 209 to allow signal lines AORO 05-22+ through to input AOR 207.

Logic signal AORCNT, FIG. 4, forces logic signals BAWRIT, the output of NAND 416 low, and BAORCK, the output of NAND 424 low writing the PRA $000000_8$ into AOR 207, FIG. 2, and location 00 into RAF 206. 70 ns. later logic signal AORCNT-30, the output of inverter 423, goes low advancing the RAF write address counter 234 to location 01.

160 ns. after logic signal CYQLTO+ rises, logic signal CYQLTO+00, the output of NOR 565, FIG. 5, goes low setting flop 503. This forces the Q output MEMREQ+ high block 905, setting flop 511. This forces the Q output, logic signal CYCREQ+ high in block 906, requesting a bus 5 cycle in block 907.

In FIG. 7, timing signal CLEAR— 701 goes high at 0 ns. of the first bus 5 cycle request forcing CYQLTO+ 702 high. This results in BAWRIT 710 and BAORCK 711 going low strobing $000000_8$ into AOR 207 and RAF 206. AORCNT-30 713 advances the RAF write address counter 234 to location 01. 160 ns. after the rise of CYQLTO+ 702, CYQLTO+0D 703 falls forcing MEMREQ+ 704 high which forces CYCREQ+ 705 high.

In decision block 907a logic signal BSBUSY—, the input to NAND 513, FIG. 5, goes high. Since logic signal CYCREQ+ is high, flop 513 sets and the Q output MYREQT goes high in block 907b.

In block 907c, if there is no higher priority request on bus 5 then the output of NAND 542 goes low setting flop 541. The Q output logic signal MYDCNN+ going high, block 907d enables drivers 212, 214 and 218 which send out on bus 5 in block 907e the output of AOR 207, $000000_8$, the cache 1 identification and function code, BSDBPL and BSMREF.

The response from main memory 3 in decision block 907f BSACKR, acknowledging the information set from cache 1 is sent back over bus 5. Signal BSACKR is applied to NOR 543 thereby forcing the output of NOR 543 low, FIG. 5, resetting flop 541 block 907i which sets flop 514 which resets flop 515. The Q outputs MYDCNN+ and MYREQT are now low and in block 907k, the Bus Cycle Request is concluded.

If the main memory 3 response was BSWAIT in decision block 907f then in decision block 907g the output of NOR 543, FIG. 5, goes low resetting flop 541 and the Q output, logic signal MYDCNN+ goes low. In blocks 907h and 907j the output of NOR 572, FIG. 5, is high forcing the output of AND 512 high keeping flop 515 set with the Q output logic signal MYREQT high, requesting another bus 5 cycle.

PRA+1 address ($000000_8$) now appears at the output of ADDER 211, FIG. 3, in block 908.

The BSACKR response to the first bus 5 cycle request sets flop 504, FIG. 5, and the Q output BLOCKF+ is high. Since the write address counter 234 is set to location 01, the output of NOR 417, FIG. 4, goes low forcing the output of NOR 419, logic signal AORCNT high. This loads in block 909 000001$_8$ into AOR 207 and location 01 of RAF 206. When logic signal AORCNT-30 goes low the RAF write address counter advances to location 02.

If FIG. 7, MYREQT 706 goes high forcing MYDCNN+ 707 high when the bus 5 is available. MYDCNN— strobes the cache 1 information onto bus 5 and when main memory 3 receives the information it sends back BSACKR 708 which resets MYDCNN+ 707 and sets BLOCKF 709. MYDCNN+ going low causes MYREQT 706 to reset. When the bus 5 is no longer busy MYREQT 706 goes high requesting another bus 5 cycle. When Block F 709 goes high to start the 2nd bus 5 cycle request BAWRIT 710 and BAORCK 711 strobe the address appearing at the output of ADDER 211, FIG. 2, into AOR 207 and RAF 206. AORCNT-30 713 then advances the RAF write address counter 234 to location 02.

Since CYCREQ+ 705 is still high in the 2nd bus 5 cycle request MYREQT 706 again goes high requesting the bus 5 cycle.

Block 907-1, FIG. 9, sheet 2, requests the 2nd bus 5 cycle and blocks 907-j as repeated to send the next address in sequence out on bus 5 with the cache identification 0002$_8$, the function code, BSDBPL and BSMREF.

In FIG. 7, MYREQT 706 high starts the 2nd bus 5 cycle request by forcing MYDCNN+ 707 high which resets CYCREQ+ 705 and strobes the information out on bus 5 as before. When main memory 3 receives the information, BSACKR 708 is sent to cache 1 over bus 5 and resets MYDCNN+ 707 which results in MYREQT 706 resetting.

In block 910, cache 1 waits for the first data word from main memory 3. In block 900, information is on bus 5. In decision block 901 CLEAR is not set selecting decision block 911 where BSDCNN+ is high indicating that information on bus 5 is to be written into FIFO 203 in block 912. In block 912a logic signal FWRITE, the output of NAND 332, FIG. 3, forces the write enable terminal of FIFO 203 low and in FIG. 2 the output of receivers 213, 215 and 217 are strobed into FIFO 203. As shown in block 912b FIFO 203 is loaded with the data word in response to the first bus 5 cycle request whereby PRA 000000$_8$ was sent to main memory 3. Also loaded into FIFO 203 is the Cache I.D. (0002$_8$) and the function code (00$_8$), logic signals BSDBPL low, BSMREF low and BSSHBC high.

Decision block 912c tests the cache identification code for 0002$_8$ and that BSMREF is low. In that case in FIG. 5 the output of AND 546, logic signal MYCHAN goes high starting the second half bus cycle of block 913.

In block 913a with logic signal MYCHAN high, the CLK input of flow 516, logic signal BSDCND+ goes high, flop 516 sets and the Q output, logic signal MYACKR goes high and acknowledges to main memory 3 that the information was received.

In block 913b the output of NAND 322, FIG. 3, logic signal FPLUSI sets the FIFO 203 write address counter flop 320 thereby advancing the counter. This forces the output of comparator 318 low resulting in flop 313 setting. The $\overline{Q}$ output logic signal FEMPTY+20 going low starts timing signal timing signal CLOCK0+ the output of NOR 311 to cycle in block 913c.

Since the function code is 00$_8$, BSAD23 is low in decision block 913d, then in block 913f the FCHZRO, flop 413, FIG. 4, sets and a "1" is forced into FIFO 203 bit position 42.

Decision block 913g tests for BSDBPL high. In the QLT mode BSDBPL is low and flop 574, FIG. 5, remains reset and the $\overline{Q}$ output, logic signal BSDBPL— is high forcing the output of NAND 506 low setting the output of NOR 507, logic signal DATACK— low setting the data counter flop 508 in block 913h.

Decision block 913i is tested for flop 509, FIG. 5, set. In this case flop 509 is not set and the output of NAND 510 remains high. In decision block 913j, logic signal BSDCNN+ is tested and 60 ns. after it goes low in block 913k, flop 516 resets and the Q output logic signal MYACKR falls and cache 1 goes into an idle cycle waiting in start block 900.

The second data word in response to the 2nd Bus Cycle Request 907-1 is transferred to cache 1. When BSDCNN+ is high FIFO write block 912-1 is activated since the data word is from an odd address location in main memory 3.

The FIFO write sequence described above is repeated through blocks 912a—c to second half bus cycle block 913-1. The second half bus cycle sequence of blocks 913a-g is repeated. In block 913h data counter flop 509, FIG. 5, is set and the Q output logic signals CYFIFO and DATCTI high in decision block 913i forces the output of NAND 510 low resetting flop 503 in block 913n and the Q output logic signal MEREQ+ falls.

The MYACKR flop 516 in block 913m is reset when in decision block 913l, logic signal BSDCNN+ goes low. In block 913n, logic signal MEMREQ+ going low resets flops 508, 509, 504, FIG. 5 and 413, FIG. 4. This forces logic signals DATCTO, DATCTI, BLOCKF+ and FCHZRO low in block 913o.

Cache 1 returns to START 900 for the first FIFO 203 read cycle.

In FIG. 7, BSDCNN+ 714 is high to start the FIFO write cycle in which the first data word from the even address location in main memory 3 is transferred to cache 1. FWRITE 715 strobes the bus 5 information into FIFO 203. MYACKR 716 is forced high when FIFO 203 contains the Cache I.D. 0002$_8$ and BSMREF is low. MYACKR 716 high advances the FIFO write address counter by forcing F PLUS 1 717 low. FIFO 203 is now not empty and FEMPTY+20 goes low starting CLOCK0+ 719 to cycle to start the first FIFO 203 read cycle.

During the first word to cache BSDBPL low forced the data counter clock pulse DATACK 728 low. During the 2nd FIFO write cycle BSDBPL is again low and DATACK 728 is again forced low forcing DATCTI 729 high. This resets MEMREQ+ 704 which resets BLOCK F 709 and DATCTI 729.

In block 913b of the second half bus cycle, the FIFO write address counter is incremented. This sets the output of comparator 318, FIG. 3, logic signal FEMPTY+ low, indicating in decision block 916 that FIFO 203 is not empty, starting the clock cycling by setting flop 313 in block 913c and starting a FIFO read operation in block 914.

The FIFO read address counter flops 316 and 317 select in block 914a the FIFO address from which information is transferred from FIFO 203 to LR 204.

Since the output of decision block 914*b* is high, that is the bit position 41 of FIFO 203 is high, the replacement block 915 is selected. The update block 914*c* is not active in the QLT operation.

RAF 206 stores the address for the data word stored in the selected FIFO 203 address location. In block 915*a* the RAF read address multiplexer 4:1 MUX 414 and 415, FIG. 4, select location 00. Logic signal CYQLTO− is low forcing the output of NOR 440 high forcing select terminal 2 of 4:1 MUX 414 and 415 high. Since bit position 18 of FIFO 203 is low, select terminal 1 of 4:1 MUX 414 and 415 are low therefore input terminal 2 is enabled. 4:1 MUX 414 input terminal 2 is low as is input terminal 2 of 4:1 MUX 415.

In block 915*b*, the address from location 00 of RAF 206 and the data word and controls from FIFO 203 are transferred to LR 204 on the rise of logic signal CYFIFO. The output of AND 324, FIG. 3, is high and on the rise of timing signal CLOCK0+ flop 323 sets and the Q output, logic signal CYFIFO goes high loading LR 204.

Decision block 915*c* tests BAOR11 and BAOR12. If both are low indicating that the first 1024 data words are being transferred then in block 915*d* the Round Robin Register is held reset selecting level 0 of the data buffer 201 and directory 202. In FIG. 6 the output of NOR 608 logic signal ROUNDR− is high. When logic signal CYFIFO goes high flop 609 sets and the $\overline{Q}$ output, logic signal ROUND-OR goes low holding flops 610 and 611 reset. In block 915*e* therefore the $\overline{Q}$ outputs logic signals ROUND0− and ROUND1− are high forcing the output of AND 613*a* logic signal LEVEL 0+ high.

In block 915*h* at the selected column address, the data word is written into the data buffer 201, the row address is written into the directory 202 and the round robin RAM's are incremented +1. The output of NOR 340, FIG. 3, is high forcing the output of NOR 325 low when logic signal CYFIFO is high, forcing the output of NOR 327 high. This sets flop 330 and the Q output CYWRIT goes high. In FIG. 6 logic signal CYWRIT high develops a 30 ns. negative going pulse delayed 20 ns. to the enable input of 2:1 MUX 223. This forces logic signal WRITE0 high, writing the data word into level 0 of data buffer 201 and writing the row address into directory 202 at the selected column address. The output of NAND 607 goes low enabling the write input of RAM 601 and 602 forcing a "1" in RAM 602 and a "0" in RAM 601 at the selected column address ADDR 08-17+ since logic signal ROUND1− is high and RNDADD+ is low.

In decision block 915*c*, address locations between 1024 and 4095 have bit positions BAOR 11+10 and/or BAOR 12+10, the output of AOR 207, FIG. 2, high. In block 915*f* normal round robin 224 operation takes place, i.e., in FIG. 6, the output of RAM 601 and 602 at the column address location ADDR 08-17+ is loaded into flops 610 and 611 at the rise of logic signal CYWRIT. The outputs of flops 610 and 611 are decoded by AND 613*a–d* in block 915*g* to select the level in directory 202 and data buffer 201 into which the data word is written. This was described supra.

The FIFO Read timing is shown in FIG. 7 by F PLUS 1 717 advancing the FIFO 203 write address counter flops 320 and 321, FIG. 3. This results in flop 313 setting the $\overline{Q}$ output FEMPTY+20 718 going low starting CLOCK0+ 719, loading the data word and control bits from FIFO 203 and the address location from RAF 206 in LR 204. LR 726 shows the timing.

CYREAD 721 and CYWRITE 722, the $\overline{Q}$ and Q outputs respectively of flop 330, FIG. 3, switch on the rise of CLOCK0+ 719 when CYFIFO 720 is high. REPLACE 723 is high since FIFO bit position 41 is high for the QLT operation. REPLACE 723 comes high at the rise of CYFIFO 720 and remains high for the 4096 data word QLT transfer.

WRITE 0-3 727 is generated in round robin 224, FIG. 6. Logic signal CYWRIT outputs AND 604 as a positive going pulse 30 ns. wide, delayed 20 ns. which is inverted by inverter 606 and enables 2:1 MUX 223. Since the select input logic signal REPLACE is high, the 1 input terminal is activated. The rise of logic signal CYWRIT set the selected output of RAM's 601 and 602 into flops 610 and 611 forcing one of the outputs of AND 613*a–d*, logic signals LEVEL 0-3+, high. This selected signal inputs terminal 1 of 2:1 MUX 223 and exits terminal 2, is inverted by inverter 255, FIG. 2 and enables the writing into data buffer 201 and directory 202 as the negative going 30 ns. wide pulse WRITE 0-3−.

The FIFO read address counter is advanced by BUMP UP 724 which causes FEMPTY+20 718 to go high and stop CLOCK0+ 719 from cycling. However, the odd word is being received by cache 1 from main memory 3 so that F PLUS 1 717 again advances the FIFO write address counter, forcing FEMPTY+20 718 low keeping CLOCK0+ 719 cycling to store the odd word in the data buffer 201, and its row address in the directory 202. After the odd word is stored FEMPTY+20 718 stays high and CLOCK0+ 720 remains high at the completion of the cycle which stores the data word from the odd address location into cache 1.

In FIG. 9, decision block 915*i* is tested for the 4096th word. If the last word was not received then in block 915*j* the address at the ADDER 211 output, FIG. 2 is incremented +1 and the RAF write address counter 234 is advanced.

Decision block 915*k* is tested. If the data word received into FIFO 203 is from an even address location in main memory 3 then cache 1 returns to START 900 to await the next word from main memory 3 from the odd address location. If the data word received into FIFO 203 is from an odd address location in main memory 3 then in block 915*l* the next address is loaded into AOR 207 and RAF 206 and the write address counter 234 is advanced. Note that in block 915*j* the WAC 234 is advanced an extra count for each data word transferred. This is so the WAC 234 stores the even address location in location 00 of RAF 206 and the odd address location in location 01 of RAF 206. Locations 02 and 03 are not used.

In block 915*m* flop 503, FIG. 5, is set as follows. The output AND 567 is high, since input logic signals CYWRIT, REPLACE and FIFO 17+20 are high. This forces the output of NOR 569, logic signal MEMREQ+0C low forcing the output of NOR 502 high setting flop 503 on the next rise of timing signal CLOCK0+. The Q output logic signal MEMREQ+ going high starts a memory request cycle by returning to block 906 where the cycle request flop 511 is set and the Q output, logic signal CYCREQ+ goes high.

In FIG. 7, MEMREQ+ 704 goes high at the end of the cycle in which the data word from the odd address location in main memory 3 is written into cache 1. This occurs when CYWRITE 722 is high on the last rise of CLOCK0+ 719.

Cache 1 continues to cycle, first requesting 2 data words from main memory 3, then writing those data words in data buffer 201 and the row address in directory 202 until in decision block 915$i$, the 4096th word is received into LR 204, FIG. 2. In that case BAOR 10+10, one input to NAND 570, FIG. 5, is high. When the output of AND 567 goes high during the cycle in which the data word from the odd address location is written into cache, the output of NAND 570 goes low resetting flop 571. In block 915$n$ this forces the Q output, logic signal CYQLTO+ low concluding the QLT operation.

BAOR 10+10 high forces the output of inverter 568, logic signal QLTDUN− low forcing the output of NOR 569, logic signal MEMREQ+0C high. This forces the output of NOR 502 low. With the D input low, flop 503 resets on the next rise of timing signal CLOCK0+ and the Q output logic signal MEMREQ+ goes low preventing further requests of main memory 3.

In FIG. 7, QLTDUN 712 goes high during the last bus 5 cycle request forcing MEMREQ+ 704 low at the next rise of CLOCK0+ 719. CYQLTO+ 702 goes low during the next cycle when CYWRITE 722 is high, the data word from the odd address location is in LR 726 at the last rise of CLOCK0+ 719.

While the invention has been described in terms of loading the cache from main memory, no specific mention was made of the exact values of the information stored in main memory. It will be appreciated that as a part of the initialization mode of operation under certain conditions, that is as a part of a power up sequence where main memory is cleared, the initial values stored in the portion of main memory to be transferred to cache are all zeros. In situations where it is desireable to perform certain types of special operations, e.g., diagnostic operations, the portion of main memory would be preloaded with values for carrying out the particular operation. Under other conditions the cache would be a valid copy of whatever information happened to be stored in main memory.

Preloading of main memory for the purpose of the present invention is carried out in a conventional manner.

While in accordance with the provisions and statutes, there has been illustrated and described the best form of the invention known, certain changes may be made to the system described without departing from the spirit and scope of the invention as set forth in the appended claims and that in some cases, certain features of the invention may be used to advantage without a corresponding use of other features.

What is claimed is:

1. A data processing system comprising:
a system bus;
an addressable main memory coupled to said bus, said main memory including a plurality of sets of word locations, each set of word locations being defined by an address;
a central processor unit coupled to said bus;
a cache coupled to said bus including,
 a data buffer having a plurality of word locations for storing data words arranged in a plurality of sets of word locations defined by said address; and
 a directory having a plurality of word locations corresponding to the number of sets in said data buffer, each word location of said directory storing an address of a corresponding one of said words of said set stored in said data buffer;
said cache further including mode control means coupled to said bus for receiving an initialization signal therefrom, indicative of said system startup operation for initializing;
cache main memory request means coupled to said mode control means for generating a sequence of main memory requests when conditioned by said mode control means; and
address generation means for generating main memory addresses included within said requests, said address generation means coupled to said bus and to said main memory requests means, said address generation means being conditioned by said request means to transfer a predetermined sequence of addresses included within corresponding ones of said sequence of requests to said system bus, said main memory in response to said requests applying to said system bus, information read out from the word locations corresponding to said sequences of addresses for writing into said data buffer and said directory thereby placing information stored in said cache in a known state.

2. The system of claim 1 wherein said system further includes;
detection gating means coupled to said address generation means and said mode control means, said detection gating means being conditioned by said address generation means upon the generation of a predetermined address to apply a reset signal to said mode control means to terminate said initialization operation.

3. The system of claim 1 wherein said addressing means includes:
an output register coupled to said bus for transferring said main memory request addresses to said main memory, said output register being conditioned by said initialization signal to store a predetermined main memory address; and,
adder means coupled to said output register for incrementing by a predetermined value said address stored in said output register when said output register is conditioned by said main memory request means to transfer said address to said bus.

4. The system of claim 3 wherein said address generation means include:
a random access file coupled to said output register and said adder means for storing said main memory request addresses, said random access file being responsive to said system bus information read out from main memory for each request to transfer said address to said directory and said data buffer for writing said address and data therein.

5. The system of claim 3 wherein said adder means is coupled to said mode control means for incrementing each said main memory request address by one when said mode control means receives said initialization signal.

6. The system of claim 1 wherein said known state is a state in which all of the storage locations of said data buffer store information identical to the contents of the information stored in the locations of a corresponding addressable area of said main memory.

7. The system of claim 6 wherein said addressable area of said main memory includes the first 4096 locations and each of said locations contains binary ZERO information, when said initialization signal is generated during a power up sequence.

8. The system of claim 5 wherein said mode control means comprises:
- a bistable circuit element including set, reset and clock input terminals, said bistable element being switched to a first state by said initialization signal applied to said clock input terminal and said bistable element being switched from said first state to a reset state in response to a signal generated by said address generation means and applied to said reset terminal, said bistable circuit element when in said first state conditioning said memory request means to generate said sequence of main memory requests.

9. A method of initializing a data processing system comprising a system bus; a main memory coupled to said system bus, said main memory storing a predetermined number of initial words in successive locations; a cache coupled to said system bus, said cache including mode control means, for receiving an initialization signal from said bus, main memory request means for generating a sequence of main memory requests and address generation means for generating a sequence of main memory requests, and mode control means coupled to said mode control means and address generation means being coupled to said bus and to said memory request means for transferring said words from said main memory to said cache; said method comprising the steps of:

a. generating said initialization signal on said system bus indicative of said system startup operation for initializing said cache;
b. setting said address generating means to a predetermined memory request address in response to said initialization signal;
c. switching said mode control means in response to said initialization signal to a predetermined state;
d. generating a first main memory request upon said main memory request means being conditioned by said mode control means when in said predetermined state;
e. transferring said predetermined memory request address as part of said main memory request over said system bus to said main memory for reading said words from said main memory to transfer to said cache;
f. generating a succession of main memory addresses and requests by said address generating means and said main memory request means respectively for reading said words from said main memory to said cache;
g. transferring said addresses as part of said requests to said main memory in response to said main memory request means when said words are received from said main memory by said cache;
h. applying to said bus in response to each of said request address, one of said initial words read out from one of said locations by said main memory specified by a corresponding one of said addresses; and,
i. writing each said initial words into a corresponding one of said locations of said cache resulting in the placing of said cache in a known state wherein said cache stores said predetermined number of said initial words.

10. The method of claim 9 wherein said cache further comprises detection gating means for detecting the termination of said initialization operation, coupled to said address generating means, said bus and said mode control means, said method further comprising the steps of:

a. said gating means detecting in response to signals received from said address generating means and sais bus when all of said predetermined initial words are stored in cache; and
b. said gating means switching said mode control means from said predetermined state to a reset state terminating said initialization operation in response to said signals received from said address generating means and said bus.

11. A data processing system comprising:
a system bus;
an addressable main memory coupled to said bus, said main memory including a plurality of locations;
a cache coupled to said bus including:
- a data buffer having a plurality of locations; and
- a directory having a plurality of locations corresponding to said plurality of locations in said data buffer, each location of said directory storing an address identifying a corresponding one of said locations of said data buffer;

said cache further including mode control means coupled to said bus for receiving an initialization signal therefrom, indicative of said system startup operation for initializing said cache;
main memory request means coupled to said mode control means for generating a sequence of main memory requests when conditioned by said mode control means; and
address generation means for generating main memory addresses included within said requests, said address generation means coupled to said bus and to said main memory request means, said address generation means being conditioned by said request means to transfer a predetermined sequence of addresses included within corresponding ones of said sequence of requests to said system bus, said main memory in response to said requests applying to said system bus information read out from the word locations corresponding to said predetermined sequence of addresses for writing into said data buffer and said directory thereby placing information stored in said cache in a known state.

12. The system of claim 11 wherein said system further includes;
detection gating means coupled to said address generation means and said mode control means, said detection gating means being conditioned by said address generation means upon the generation of a predetermined address to apply a reset signal to said mode control means to terminate said initialization operation.

13. The system of claim 11 wherein said addressing means includes:
an output register coupled to said bus for transferring said main memory request addresses to said main memory, said output register being conditioned by said initialization signal to store a predetermined main memory address; and,
adder means coupled to said output register for incrementing by a predetermined value said address stored in said output register when said output register is conditioned by said main memory request means to transfer said address to said bus.

14. The system of claim 13 wherein said address generation means include:

a random access file coupled to said output register and said adder means for storing said main memory request addresses, said random access file being responsive to said system bus information read out from main memory for each request to transfer said address to said directory and said data buffer for writing said address and data therein.

15. The system of claim 13 wherein said adder means is coupled to said mode control means for incrementing each said main memory request address by one when said mode control means receives said initialization signal.

16. The system of claim 11 wherein said known state is state in which all of the storage locations of said data buffer store information identical to the contents of the information stored in the locations of a corresponding addressable area of said main memory.

17. The system of claim 16 wherein said addressable area of said main memory includes the first 4096 locations and each of said locations contains binary ZERO information, when said initialization signal is generated during a power up sequence.

18. The system of claim 15 wherein said mode control means comprises:

a bistable circuit element including set, reset and clock input terminals, said bistable element being switched to a first state by said initialization signal applied to said clock input terminal and said bistable element being switched from said first state to a reset state in response to a signal generated by said address generation means and applied to said reset terminal, said bistable circuit element when in said first state conditioning said memory request means to generate said sequence of main memory requests.

* * * * *